United States Patent
Hsiung

(10) Patent No.: US 9,861,872 B1
(45) Date of Patent: *Jan. 9, 2018

(54) PHYSICAL FITNESS EXERCISE DEVICE WHICH SIMULATES HORSEBACK RIDING AND ALSO FACILITATES UPPER BODY AND LOWER BODY EXERCISE

(71) Applicant: Bob Hsiung, Walnut, CA (US)

(72) Inventor: Bob Hsiung, Walnut, CA (US)

(73) Assignee: Hupa International Inc., Walnut, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/425,885

(22) Filed: Feb. 6, 2017

Related U.S. Application Data

(63) Continuation-in-part of application No. 14/741,165, filed on Jun. 16, 2015, now Pat. No. 9,561,418.

(51) Int. Cl.
| | |
|---|---|
| *A63B 21/015* | (2006.01) |
| *A63B 21/22* | (2006.01) |
| *A63B 22/00* | (2006.01) |
| *A63B 22/06* | (2006.01) |
| *A63B 69/04* | (2006.01) |

(52) U.S. Cl.
CPC ............ *A63B 69/04* (2013.01); *A63B 22/001* (2013.01); *A63B 22/0605* (2013.01); *A63B 21/015* (2013.01); *A63B 21/225* (2013.01)

(58) Field of Classification Search
CPC . A63B 22/06–2022/0641; A63B 69/04; A63B 23/0205–23/0222
See application file for complete search history.

(56) References Cited

U.S. PATENT DOCUMENTS

| | | | | |
|---|---|---|---|---|
| 5,453,066 A | * | 9/1995 | Richter, Jr. ............ | A63B 69/04 482/57 |
| 7,393,308 B1 | * | 7/2008 | Huang ................. | A63B 22/001 482/51 |
| 2004/0198561 A1 | * | 10/2004 | Corbalis ............ | A63B 22/0605 482/57 |
| 2010/0130331 A1 | * | 5/2010 | Hu ..................... | A63B 22/0046 482/57 |
| 2010/0248902 A1 | * | 9/2010 | Ge ..................... | A63B 22/0089 482/51 |

* cited by examiner

*Primary Examiner* — Loan H Thanh
*Assistant Examiner* — Jennifer M Deichl
(74) *Attorney, Agent, or Firm* — Thomas I. Rozsa

(57) ABSTRACT

A physical fitness device that simulates the motion of horseback riding. Innovative features of the present invention include a horseback riding simulation post which extends both vertically, at a vertical angle toward a rider seated on the device, and an upwardly extending longitudinal section which extends toward a rider on the exercise device seat and terminates in a transverse handle which enables the user to grasp the handle with both hands or one hand. There are a pair of parallel crank arms with a respective one of the crank arms adjacent opposite sides of the exercise device with each crank arm having an upwardly extending section extending forwardly or rearwardly.

19 Claims, 37 Drawing Sheets

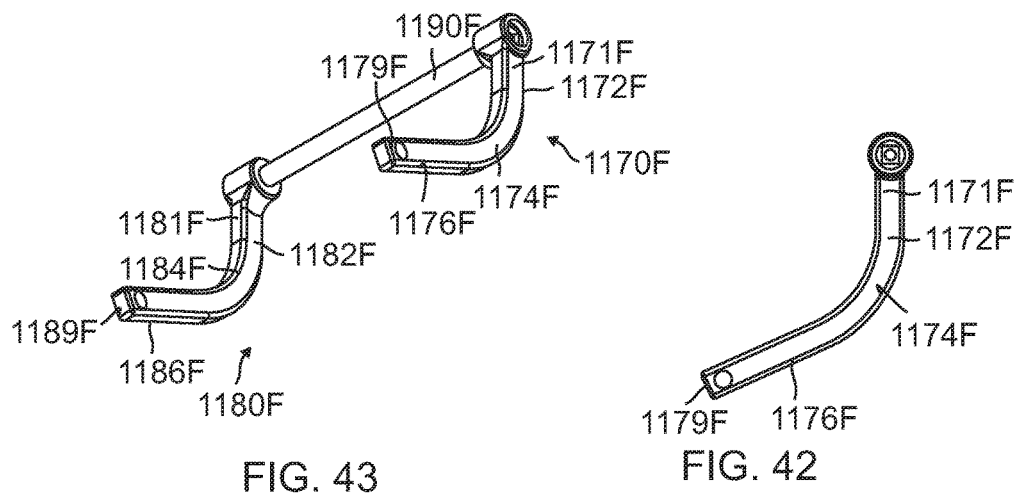
FIG. 43
FIG. 42
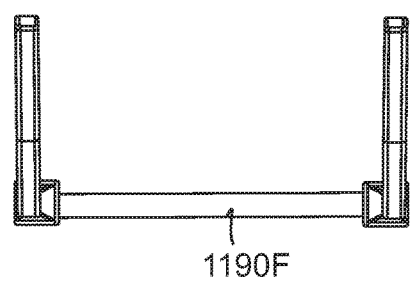
FIG. 41
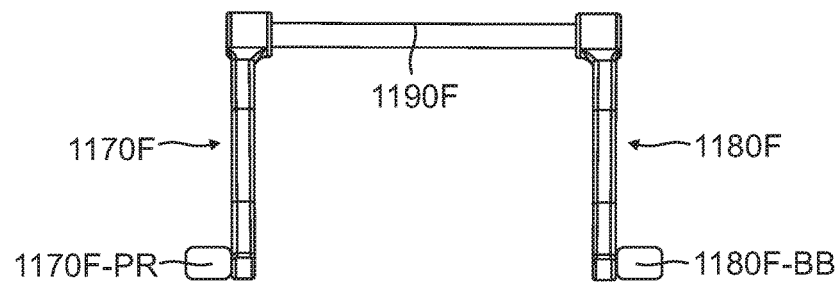
FIG. 40

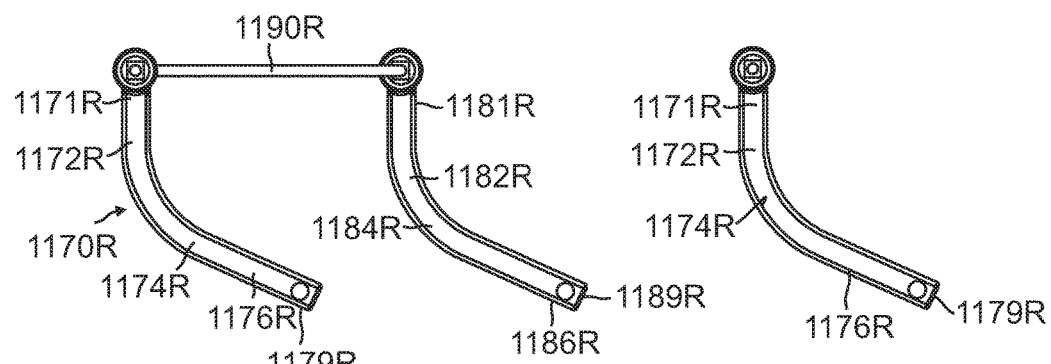
FIG. 48
FIG. 47
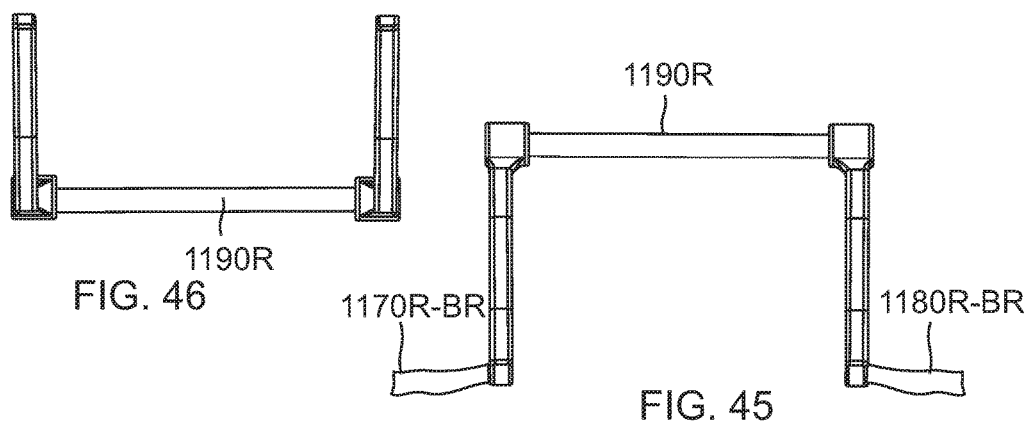
FIG. 46
FIG. 45
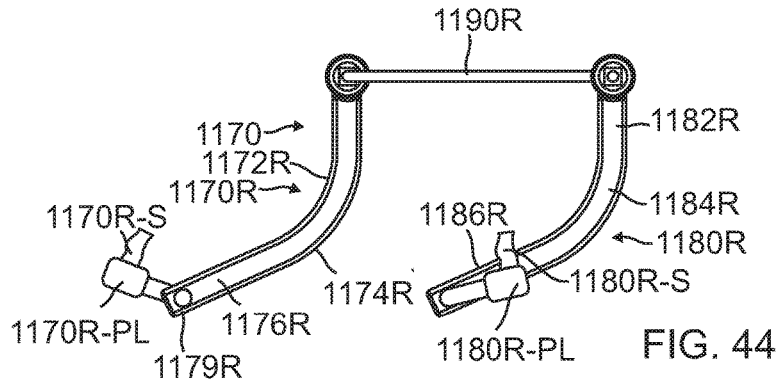
FIG. 44

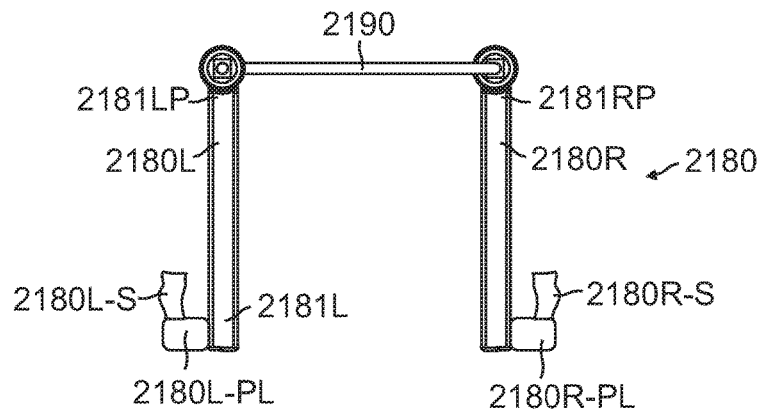
FIG. 49
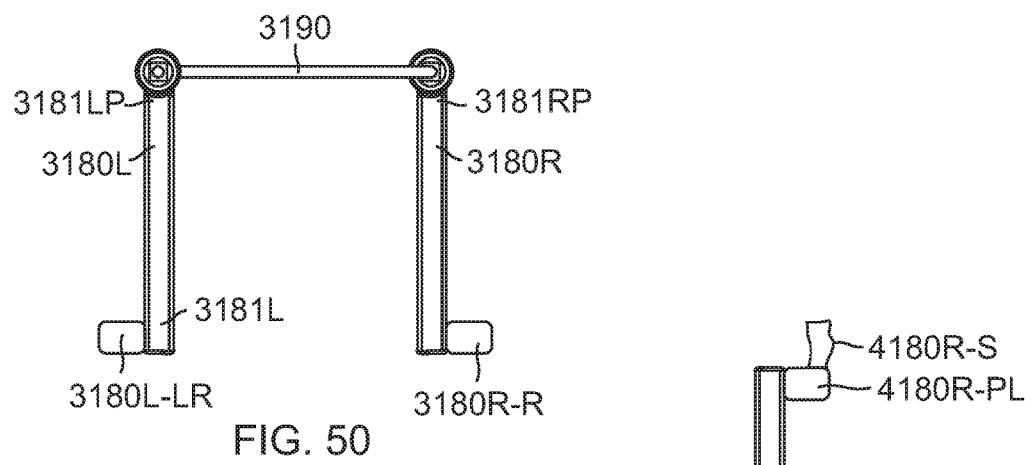
FIG. 50
FIG. 51
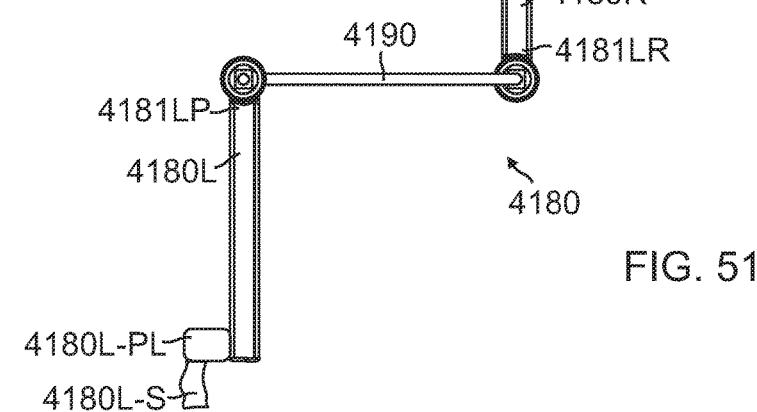

PHYSICAL FITNESS EXERCISE DEVICE WHICH SIMULATES HORSEBACK RIDING AND ALSO FACILITATES UPPER BODY AND LOWER BODY EXERCISE

CROSS-REFERENCE TO RELATED APPLICATION

This patent application is a continuation-in-part of patent application Ser. No. 14/741,165 filed Jun. 16, 2015.

BACKGROUND OF THE INVENTION

1. Field of the Invention

The present invention relates to the field of exercise equipment and in particular, to a physical fitness device that provides an enjoyable experience as well as facilitating upper body and lower body exercise for physical fitness.

2. Description of the Prior Art

For many people, especially middle aged people and senior citizens, exercise is unpleasant work, not fun. In the information disclosure statement which is filed with this patent application, patents protecting exercise devices are listed. While exercise devices may be purchased, the average consumer is too busy working to undertake a sufficient amount of exercise. This eventually affects the physical strength and health of the person. Various physical fitness devices which are usually very compact and occupy a small amount of storage spaces, are available in the market to allow a user to engage in exercising at home.

In general, physical fitness devices are operated by the user's feet pushing downwardly on pedals. These include a vertical bicycle, a recumbent bicycle, a treadmill, a stair climber, an elliptical trainer, and a stepping machine. All of these physical fitness devices are operated by alternative movement of the feet of the user. Taking a vertical exercise bike as an example, the conventional vertical exercise bike comprises a frame positionable on the ground. The frame supports thereon a handlebar and a seat cushion. The frame also supports a drive wheel and a flywheel driven by the drive wheel. To operate the exercise device, a user sits on the seat cushion and uses his or her feet to alternately push down on pedals which cause the drive wheel to drive the rotation of the flywheel, so as to provide exercise on muscles of the user's legs. Variations in exercise bicycles such as a NuStep recumbent bicycle has forward and horizontally moving pedals and forward moving handles. The result is very little exercise on the upper portion of the user's body. Even a recumbent bicycle where the user is seated and pushes in a forward direction on the pedals is also lacking in substantially exercising the upper body.

The present inventor, Bob Hsiung, is an innovator in the field of exercise equipment. The present inventor's exercise equipment is innovative and facilitates good health of a user. Elliptical trainers, stepping machines, ski-simulation machines, skating simulation machines, etc. are wonderful devices. However, the present inventor, after careful analysis, has determined that there is a significant need for an exercise device that not only promotes good health, but is also a new way to exercise on and provides upper body exercise as well as lower body exercise. The present invention provides this additional benefit of providing an exercise device that is fun to use as well as promotes better health and a longer life.

There is a significant need for such an improved exercise device which provides full body exercise and which is enjoyable to exercise on.

SUMMARY OF THE INVENTION

The present invention is a physical fitness device that simulates the motion of horseback riding so as to provide an exercise device which is fun to exercise with. Variations of the present invention simulate simple siting on a horse and horseback walking the horse and also more vigorous horseback riding such as cantering and galloping. Owning a living horse to ride on is very expensive. Going to a horse ranch to ride a horse is time consuming.

The present invention simulates horseback riding in an exercise device which is useable in a home, office, exercise facility, hotel exercise rooms and other indoor facilities. Innovative features of the present invention include a fixed central post to which a vertical horseback riding simulation post at attached. The fixed vertical horseback riding simulation post includes a first section which extends both vertically and at a vertical angle away from the rider seated on a seat of the device, a curved intermediate section which causes the direction of the horseback riding simulation post to change directions and extend toward the seated rider which curved intermediate section extends to a second section having a longitudinal section extending at an upwardly extending longitudinal angle toward a rider on the seat of the exercise device. The upwardly extending longitudinal section terminates at its distal end in a transverse handle which enables the user to grasp the handle with both hands or one hand. It is within the spirit and scope of the present invention for the upwardly extending longitudinal section to terminate ast its distal end in a handle of any shape and size which facilitates the handle being grasped by at least one hand of a rider.

While an embodiment of the horseback riding simulation post has been described as a fixed post, it is also within the spirit and scope of the present invention for the first section to be telescoping, the second section to be telescoping or both sections to be telescoping to adjust the height, angle and distance of the horseback riding simulation post relative to a rider.

An additional innovative feature of the present invention is the creation of a pair of arcuate forwardly extending crank arms each terminating in a respective foot pedal at a distal end of each respective arcuate forwardly extending crank arm. The arcuate forwardly extending crank arms include a pair of parallel arcuate crank arms with a respective one of the arcuate forwardly extending crank arms adjacent opposite longitudinal sides of the exercise device with each arcuate forwardly extending crank arm having a first section which is an upwardly extending section extending in the direction of the seat and the front of the exercise device and extending to an intermediate curved section which in turn extends to a second section which is a vertically and forwardly extending section extending in a direction toward the seat and toward the front of the exercise device. The second section of each arcuate crank arm terminates in a transverse foot pedal at a distal end. In certain prior art exercise devices, the forwardly extending crank arm is straight. This results in a "dead angle" where the crank arm is frozen. The arcuate forwardly extending crank arm eliminates the dead angle. Having both crank arms being both arcuate and extending in a forward direction is a unique feature of the present invention and combined with the above described central simulation horseback riding post facilitates the device simulating a horseback ride.

A modified additional innovative feature of the present invention is the creation of a pair of modified arcuate forwardly extending crank arms each terminating in a respective foot pedal at a distal end of each respective modified arcuate forwardly extending crank arm. The modified arcuate forwardly extending crank arms include a pair of parallel modified arcuate crank arms with a respective one of the modified arcuate forwardly extending crank arms adjacent opposite longitudinal sides of the exercise device with each modified arcuate forwardly extending crank arm having a first section which is a downwardly extending section extending in a direction away from the seat and the front of the exercise device and extending to an intermediate curved section which in turn extends to a second section which is a vertically downward and forwardly extending section extending in a direction away from the seat and toward the front of the exercise device. The second section of each modified arcuate crank arm terminates in a foot pedal at a distal end which is a transverse bar or a pedal with a foot strap. Having both crank arms being both arcuate and extending in a downward and forward direction is another unique feature of the present invention and combined with the above described central simulation horseback riding post facilitates the device simulating a horseback ride.

An additional innovative feature of the present invention is the creation of a pair of arcuate rearwardly extending crank arms each terminating in a respective foot pedal at a distal end of each respective arcuate rearwardly extending crank arm. The arcuate rearwardly extending crank arms include a pair of parallel arcuate crank arms with a respective one of the arcuate rearwardly extending crank arms adjacent opposite longitudinal sides of the exercise device with each arcuate rearwardly extending crank arm having a first section which is an upwardly extending section extending in a direction away from the seat and toward the rear of the exercise device and extending to an intermediate curved section which in turn extends to a second section which is a vertically and rearwardly extending section extending in a direction toward the seat and toward the front of the exercise device. The second section of each arcuate crank arm terminates in a transverse foot pedal at a distal end. In certain prior art exercise devices, the rearwardly extending crank arm is straight. This results in a "dead angle" where the crank arm is frozen. The arcuate rearwardly extending crank arm eliminates the dead angle. Having both crank arms being both arcuate and extending in a rearward direction is a unique feature of the present invention and combined with the above described central simulation horseback riding post facilitates the device simulating a horseback ride.

An additional innovative feature of the present invention is the creation of a pair of modified arcuate rearwardly extending crank arms each terminating in a respective foot pedal at a distal end of each respective modified arcuate rearwardly extending crank arm. The modified arcuate rearwardly extending crank arms include a pair of parallel arcuate crank arms with a respective one of the modified arcuate rearwardly extending crank arms adjacent opposite longitudinal sides of the exercise device with each modified arcuate rearwardly extending crank arm having a first section which is a downwardly extending section extending in a direction away from the seat and toward the rear of the exercise device and extending to an intermediate curved section which in turn extends to a second section which is a vertically downward and rearwardly extending section extending in a direction away from the seat and toward the rear of the exercise device. The second section of each arcuate crank arm terminates in a foot pedal at a distal end, which foot pedal is a transverse bar or pedal with a foot strap. The modified arcuate rearwardly extending crank arms is another unique feature of the present invention and combined with the above described central simulation horseback riding post facilitates the device simulating a horseback ride.

A modified additional innovative feature of the present invention is the creation of a pair of straight crank arms each terminating in a respective foot pedal at a distal end of each respective straight crank arm. The variations include (a) both straight crank arms initially extend upwardly on opposite longitudinal sides of the exercise device; (b) one straight crank arm initially extending upwards and the opposite straight crank arm initially extending downwardly. Since the pedaling motion is circular, each crank arm will rotate three hundred sixty degrees (360) degrees. Each straight crank arm will terminate in a pedal, either a transverse bar or a pedal with a strap.

In addition, the device includes a pair of spaced apart vertically extending stationary posts. In one variation, the posts are spaced apart and not connected to each other. In another variation, the posts are one integral interconnected unit with portions spaced apart from each other.

In a first variation, the device includes a pair of spaced apart vertically extending stationary posts located in front of the seat and spaced at a distance away from the seat to require a rider to grasp a respective post with a respective one of the rider's hands. The rider or user sits on the seat and simultaneously pushes downwardly and forwardly/or rearwardly on a respective pedal of a forwardly/rearwardly extending section of a respective arcuate crank arm with a respective one of the rider's feet. Concurrently, the rider grasps a respective vertically extending stationary post with a respective one of the rider's hands to create a resistance on the rider's arms which is translated to the rider's upper torso and stomach. The exercise facilitates a back and forth motion of the rider's arms, torso and stomach to enable an exercise of the upper body. The rider's legs simultaneously are exercised by the downward and forward/rearward force of a respective one of the rider's feet on a respective one of the transverse pedals of a forward/rearward section of a respective forwardly/rearwardly extending arcuate crank arm combined with a resistance created by a combination drive-wheel and flywheel.

The variation is comparable to the above described first variation with the addition of an interconnecting section adjacent a respective upper portion of each vertically extending stationary post. The two spaced apart vertically extending stationary posts and interconnecting sections are formed as one integral unit or alternatively formed as three interconnected components.

It is an object of the present invention to provide the benefits of simulating horseback riding at home or other indoor location without incurring the disadvantages of riding on a living horse.

It is also an object of the present invention to provide an upper body exercise to the user's arms, torso and stomach and lower body exercise to the user's legs.

Another object of the present invention is to provide a physical fitness device that simulates the motion of horseback riding to create an enjoyable experience while the user is exercising.

The above objectives are realized through the following technical solution, of which a physical fitness device is provided, comprising the following components:

1. A bottom section comprises a base positionable on the ground. The base comprises, in sequence from a front end to a rear end, a front transverse support member and a spaced apart rear transverse support member which are interconnected by a central longitudinal interconnecting beam. In one variation all two transverse support members and the central longitudinal interconnecting beam are fixed beams. In an alternative variation, the front transverse support member and spaced apart rear transverse support member are spring members while the interconnecting central longitudinal beam is a fixed beam.

2. A body affixed at a bottom longitudinal wall to an upper surface of the central longitudinal interconnecting beam, the body comprising a pair of spaced apart vertically extending sidewalls, an interconnecting front wall, an interconnecting rear wall and an interconnecting top wall. The respective interior surfaces of the bottom wall, pair of spaced apart sidewalls, interconnecting front wall, interconnecting rear wall and interconnecting top wall surround an interior chamber retaining some of the operating components and resistance components which can be a conventional combination resistance flywheel and drive wheel;

3. A first interconnecting member includes a bottom wall affixed to the top wall of the body (at a location adjacent the front of the body), a circumferential sidewall and a top wall. The central fixed vertically and partially arcuately extending main post is affixed to the top surface of the interconnecting member and also extends to a portion of the internal operating apparatus. The first section of the previously described central horseback riding simulation post used to facilitate a horseback riding exercise is affixed at a central width-wise location on the central vertically extending main post. As set forth above, the horseback riding simulation post has been described as a fixed post, and it is also within the spirit and scope of the present invention for the first section to be telescoping, the second section to be telescoping or both sections to be telescoping to adjust the height, angle and distance of the horseback riding simulation post relative to a rider. The previously described pair of spaced apart vertically extending stationary posts located in front of the seat and spaced at a distance away from the seat require a rider to grasp a respective post. The posts are respectively affixed on opposite sides of the central fixed main post. The posts can be completely separate or interconnected as preciously described;

4. A second interconnecting member includes a bottom wall affixed to the top wall of the body (at a location adjacent the rear of the body), a circumferential sidewall and a top wall. A central fixed vertical post is affixed at one end to a top surface of the second interconnecting member and extends to a portion of the interior operating apparatus, and its opposite end adjustably supports a bicycle seat;

5. A pair of parallel arcuate forwardly or rearwardly extending crank arms each terminating in a transverse pedal with a respective one of the arcuate forwardly or rearwardly extending crank arms are respectively located adjacent opposite longitudinal sides of the exercise device with each arcuate forwardly or rearwardly extending crank arm has an upwardly extending section extending to a curved intermediate section extending to a respective forward section extending in the direction of the seat and the front of the exercise device or a respective rearward section extending in the direction of the seat and the rear of the exercise device (having both arcuate forwardly or rearwardly extending crank arms which eliminate a frozen dead angle, which occurs when the crank arm is straight and not arcuate or bent in the middle) extending in a forward direction toward the front of the exercise device or extending in a rearward direction toward the rear of the exercise device is a unique feature of the present invention and is additionally distinctive when combined with the above described central horseback riding simulation post to facilitate the device simulating a horseback ride. The arcuate forwardly/rearwardly extending crank arms are respectively affixed at a lower end to an interior operating apparatus such as a flywheel wheel and drive wheel to provide resistance.

The present invention offers advantages over the known fitness equipment with respect to versatility of training, effectiveness of training and style of exercise.

Described in detail, the present improved invention is an exercise apparatus comprising: (a) a bottom section including a base with front transverse support member at a front end interconnected to a rear transverse support member at a rear end by a longitudinal interconnecting beam; (b) a body affixed at a bottom longitudinal wall to an upper surface of the central longitudinal beam, the body including a left sidewall and a spaced apart right sidewall interconnected by bottom longitudinal wall, a front wall, a rear wall and top wall, surrounding an interior chamber retaining operating components of the physical fitness device; (c) a central fixed vertically extending post including a lower straight section extending toward the front of the exercise apparatus, an arcuate section and an upper straight section extending toward the rear of the exercise apparatus; (d) a horseback riding simulation post including a first straight lower section affixed to and aligned with the lower straight section of the central fixed vertically extending post, the first straight lower section extending to an arcuate section which extends to a second straight upper section which extends vertically and horizontally toward the rear of the exercise apparatus and towards a seat configured to support a seated rider, a distal end of the second straight upper section terminating in a handle; (e) a left fixed grasping post including a first lower fixed section affixed to a left side of the lower straight section of the central fixed vertically extending post, the lower fixed section beginning in a first straight portion and extends to a first arcuate portion which extends in the vertical and horizontal direction toward the rear of the exercise apparatus, then extends to a second arcuate portion which extends to a third arcuate section which reverses the direction of the left fixed grasping post and extends a grasping portion which extends in a vertical and horizontal direction toward the front of the exercise apparatus; (f) a right fixed grasping post including a first lower fixed section affixed to a right side of the lower straight section of the central fixed vertically extending post, the lower fixed section beginning in a first straight portion and extends to a first arcuate portion which extends in the vertical and horizontal direction toward the rear of the exercise apparatus, then extends to a second arcuate portion which extends to a third arcuate section which reverses the direction of the left fixed grasping post and extends a grasping portion which extends in a vertical and horizontal direction toward the front of the exercise apparatus; (g) a post retaining the seat, the seat retained over the body and at a first given distance from the horseback riding simulation post and at a second given distance from the first fixed grasping post and the second fixed grasping post; (h) a left arcuate forwardly extending crank arm including a first downwardly extending section extending to a curved intermediate section which in turn extends to a second section which is a vertically downward and forwardly extending section extending in a direction away from the seat and toward the front of the exercise device and terminating in a left pedal at a distal end of the second section and spaced away from a left sidewall of the body; and (i) a right arcuate forwardly extending crank arm including a first downwardly extending section extending to a curved intermediate section which in turn extends to a second section which is a vertically downward and forwardly extending section extending in a direction away from the seat and toward the front of the exercise device and terminating in a right pedal at a distal end of the second section and spaced away from a right sidewall of the body.

Described more broadly, the present invention is an exercise apparatus comprising: (a) a bottom section including a base with front transverse support member at a front end interconnected to a rear transverse support member at a rear end by a longitudinal interconnecting beam; (b) a body affixed at a bottom longitudinal wall to the central longitudinal beam, the body including at least a left sidewall and a spaced apart right sidewall; (c) a central fixed vertically extending post including at least a lower straight section; (d) a horseback riding simulation post including a first straight lower section affixed to and aligned with the lower straight section of the central fixed vertically extending post, the first straight lower section extending to an arcuate section which extends to a second straight upper section which extends vertically and horizontally toward the rear of the exercise apparatus and towards a seat configured to support a seated rider, a distal end of the second straight upper section terminating in a handle; (e) a left fixed grasping post including a first lower fixed section affixed to a left side of the lower straight section of the central fixed vertically extending post, the lower fixed section beginning in a first straight portion and extends to at least a left grasping arcuate portion which extends in the vertical and horizontal direction toward the rear of the exercise apparatus; (f) a right fixed grasping post including a first lower fixed section affixed to a right side of the lower straight section of the central fixed vertically extending post, the lower fixed section beginning in a first straight portion and extends to at least a fright grasping arcuate portion which extends in the vertical and horizontal direction toward the rear of the exercise apparatus; (g) a post retaining the seat, the seat retained over the body and at a first given distance from the horseback riding simulation post and at a second given distance from the first fixed grasping post and the second fixed grasping post; (h) a left arcuate forwardly extending crank arm including a first downwardly extending section extending to a curved intermediate section which in turn extends to a second section which is a vertically downward and forwardly extending section extending in a direction away from the seat and toward the front of the exercise device and terminating in a left pedal at a distal end of the second section and spaced away from a left sidewall of the body; and (i) a right arcuate forwardly extending crank arm including a first downwardly extending section extending to a curved intermediate section which in turn extends to a second section which is a vertically downward and forwardly extending section extending in a direction away from the seat and toward the front of the exercise device and terminating in a right pedal at a distal end of the second section and spaced away from a right sidewall of the body.

Described alternatively, the present invention is a exercise apparatus comprising: (a) a bottom section including a base with front transverse support member at a front end interconnected to a rear transverse support member at a rear end by a longitudinal interconnecting beam; (b) a body affixed at a bottom longitudinal wall to the central longitudinal beam, the body including at least a left sidewall and a spaced apart right sidewall; (c) a central fixed vertically extending post including at least a lower straight section; (d) a horseback riding simulation post including a first straight lower section affixed to and aligned with the lower straight section of the central fixed vertically extending post, the first straight lower section extending to an arcuate section which extends to a second straight upper section which extends vertically and horizontally toward the rear of the exercise apparatus and towards a seat configured to support a seated rider, a distal end of the second straight upper section terminating in a handle; (e) a left fixed grasping post including a first lower fixed section affixed to a left side of the lower straight section of the central fixed vertically extending post, the lower fixed section beginning in a first straight portion and extends to at least a left grasping arcuate portion which extends in the vertical and horizontal direction toward the rear of the exercise apparatus; (f) a right fixed grasping post including a first lower fixed section affixed to a right side of the lower straight section of the central fixed vertically extending post, the lower fixed section beginning in a first straight portion and extends to at least a fright grasping arcuate portion which extends in the vertical and horizontal direction toward the rear of the exercise apparatus; (g) a post retaining the seat, the seat retained over the body and at a first given distance from the horseback riding simulation post and at a second given distance from the first fixed grasping post and the second fixed grasping post; (h) a left straight crank arm terminating in a left pedal at a distal end; and (i) a right straight crank arm terminating in a right pedal at a distal.

Further novel features and other objects of the present invention will become apparent from the following detailed description, discussion and the appended claims, taken in conjunction with the drawings.

BRIEF DESCRIPTION OF THE DRAWINGS

Referring particularly to the drawings for the purpose of illustration only and not limitation, there is illustrated:

FIG. 40 is a top plan view of the pair of crank arms of the present invention illustrated in FIG. 39, with a variation of the pedal being a pair of transverse rods;

FIG. 41 is a bottom plan view of the pair of crank arms of the present invention illustrated in FIG. 3, with no details of the pedals;

FIG. 42 is a side-elevational view of one of the pair of crank arms of the present invention illustrated in FIG. 39, with no details of the pedal;

FIG. 43 is a front perspective view of the a pair of parallel pedals of the present invention with each crank arm having a downwardly extending section, an arcuate section and a downwardly and forwardly extending section, and a connecting bar connecting the pair of crank arms together, with no details of the pedals;

FIG. 44 is a rear perspective view of a fourth embodiment of a pair of parallel crank arms of the present invention with each crank arm having a downwardly extending section, an arcuate section and a downwardly and rearwardly extending section, and a connecting bar connecting the pair of crank arms together, also illustrating one variation of the pedal which is a pedal plate and a strap;

FIG. 45 is a top plan view of the pair of crank arms of the present invention illustrated in FIG. 44, with a variation of the pedal being a pair of transverse rods;

FIG. 46 is a bottom plan view of the pair of crank arms of the present invention illustrated in FIG. 44, with no details of the pedals;

FIG. 47 is a side-elevational view of one of the pair of crank arms of the present invention illustrated in FIG. 44, with no details of the pedal;

FIG. 48 is a front perspective view of the a pair of parallel crank arms of the present invention with each crank arm having a downwardly extending section, an arcuate section and a downwardly and rearwardly extending section, and a connecting bar connecting the pair of crank arms together, with no details of the pedals;

FIG. 49 is a front view of a fifth variation of a pair a crank arms where both crank arms a straight, each respective crank arm having a pedal plate and a strap at a respective distal end, the crank arms are connected by a pedal bar, and the crank arms are on opposite sides of the exercise device and the crank arms extend in the same direction;

FIG. 50 is a front view of a fifth variation of a pair a crank arms where both crank arms a straight, each respective crank arm having a transverse rod for a pedal at a respective distal end, the crank arms are connected by a pedal bar, and the crank arms are on opposite sides of the exercise device and the crank arms extend in the same direction;

FIG. 51 is a front view of a fifth variation of a pair a crank arms where both crank arms a straight, each respective crank arm having a pedal plate and a strap at a respective distal end, the crank arms are connected by a pedal bar, and the crank arms are on opposite sides of the exercise device and the crank arms extend in opposite directions;

DETAILED DESCRIPTION OF THE PREFERRED EMBODIMENTS

Figure 1:
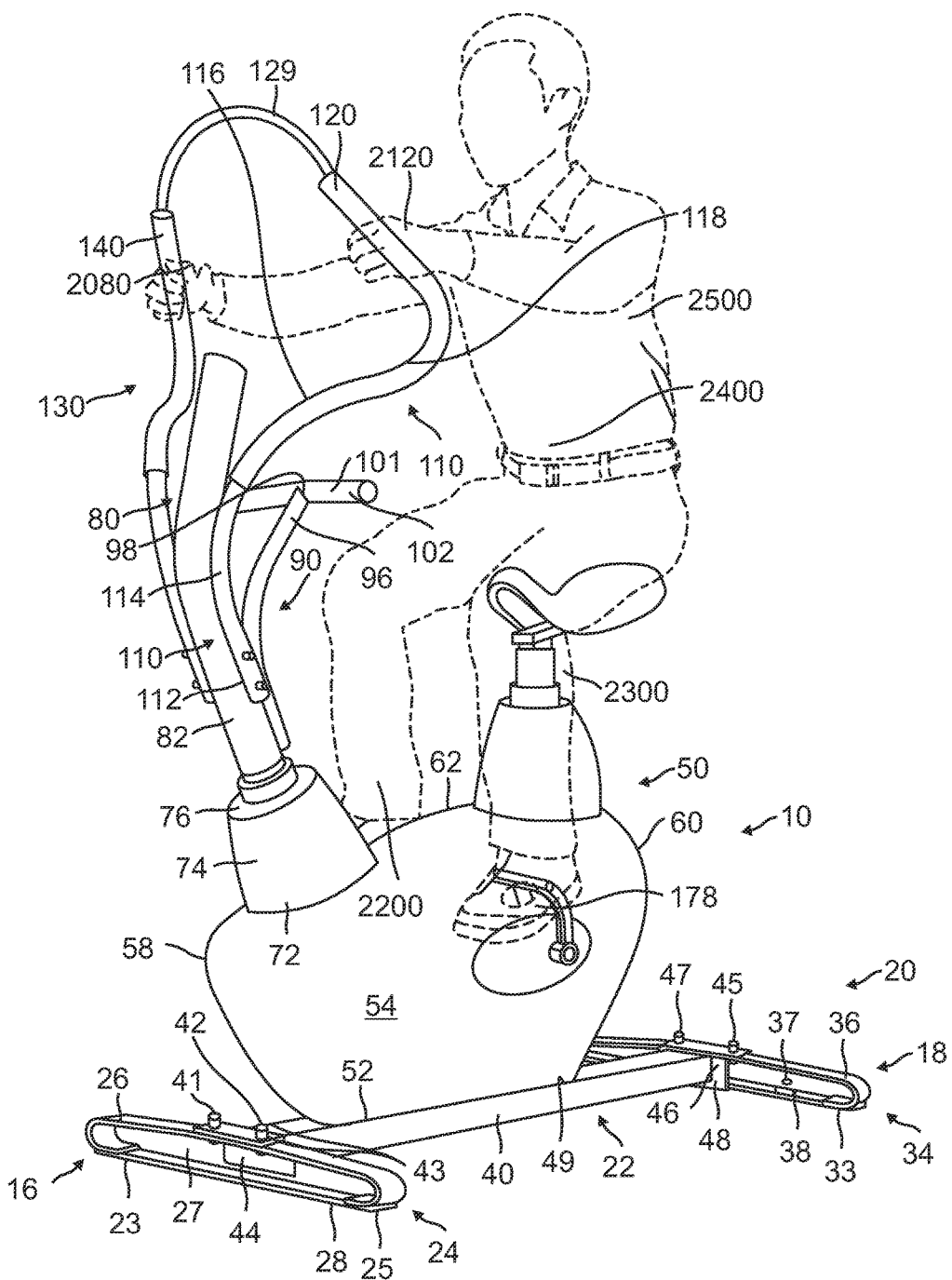
FIG. 1 is a left front perspective view of an embodiment of the present invention physical fitness exercise device illustrating a rider performing both an upper body and a lower body exercise including one variation of integral grasping posts.

Although specific embodiments of the present invention will now be described with reference to the drawings, it should be understood that such embodiments are by way of example only and merely illustrative of but a small number of the many possible specific embodiments which can represent applications of the principles of the present invention. Various changes and modifications obvious to one skilled in the art to which the present invention pertains are deemed to be within the spirit, scope and contemplation of the present invention as further defined in the appended claims.

The present invention exercise physical exercise device 10 is designed to comprise several innovative variations which can be used in any combination as set forth in the following summary.

1. Supporting Base:

A bottom section comprising a base positioned on the ground, and including a front transverse support member, a central longitudinal interconnecting member and a rear transverse support member. The central longitudinal interconnecting member is a fixed beam in both variation. The alternative configurations are as follows:
 (a) each of the front and rear transverse support members is a spring which can be configured as a flexible oval sheet of material having a flexible upper portion separated from a parallel flexible lower portion;
 (b) each of the front and rear transverse support members is a fixed beam;

2. Arcuate crank arms connected to a resistance member and terminating in a pedal at an opposite distal end:
 (a) a pair of parallel arcuate forwardly extending crank arms each having an arcuate forwardly and upwardly extending section extending to a curved intermediate section extending to a forward section extending in the direction of the seat and the front of the exercise device; or
 (b) a pair of parallel arcuate rearwardly extending crank arms each having an arcuate rearwardly and upwardly extending section extending to a curved intermediate section extending to a forward section extending in a direction away from the seat and the rear of the exercise device.

3. A simulation horseback riding post having a bottom section to a central fixed vertically and partially arcuately extending main post, the variations comprising:
 (a) a completely fixed non-telescoping member having the first section of the central horseback riding simulation post used to facilitate a horseback riding exercise affixed at a central width-wise location on the central vertically extending main post, the first section which extends both vertically and at a vertical angle away from the rider seated on a seat of the device, a curved intermediate section which causes the direction of the horseback riding simulation post to change directions and extend toward the seated rider which curved intermediate section extends to a second section having a longitudinal section extending at an upwardly extending longitudinal angle toward a rider on the seat of the exercise device. The upwardly extending longitudinal section terminates at its distal end in a transverse handle which enables the user to grasp the handle with both hands or one hand;
 (b) a first variation single telescoping horseback riding simulation post with the first section affixed as described above and having telescoping portions with at least one portion telescoping into another and last telescoping portion connected to the curved interconnecting section, the remainder the same as the fixed embodiment;

(c) a first variation single telescoping horseback riding simulation post with the first section affixed as described above and having telescoping portions with at least one portion telescoping into another and last telescoping portion connected to the curved interconnecting section, the remainder the same as the fixed embodiment;

(d) a second variation single telescoping horseback riding simulation post with the first section affixed as described above and the same as described in the first embodiment with the first straight lower section and arcuate interconnecting section fixed and the second section having telescoping portions with at least one portion telescoping into another with the lowermost portion affixed to the curved interconnecting section and the uppermost portion affixed to the transverse handle;

(e) third variation is a fully telescoping variation combination of the first and second alternative variations.

4. Fixed Posts (a) In a first embodiment, the pair of spaced apart vertically extending stationary posts are located in front of the seat and spaced at a distance away from the seat to require a rider to grasp a respective post. The posts are respectively affixed on opposite sides of the central fixed main post. The posts are completely separate;

(b) the first variation is the same as the first embodiment with the addition that the posts are interconnected to for a single integrated post with spaced apart vertical portions for grasping as described above.

The present invention is any combination including at least one of the variations or embodiments, either individually or combined with one or more of the variations set forth above.

The present invention will now be described illustrating each variation in at least one figure.

Referring to FIGS. 1 through 12, there are illustrated exterior views of the present invention, some figures including a rider using the exercise device in a given manner and incorporating illustrations of various embodiments. The rider is illustrated in dotted lines for illustrative purposes to illustrate how the present invention is used, the dotted lines forming no part of the present invention.

The present invention physical exercise device is numbered 10. The embodiment with each of the front and rear transverse support members being a spring which can be configured as a flexible oval sheet of material having a flexible upper portion separated from a parallel flexible lower portion is illustrated in FIGS. 1 through 12. A first variation of the present invention the exercise device is illustrated in FIGS. 1 through 4 is comprised of the following components:

1. A bottom section 20 comprises a base 22 positioned on the ground. The base 22 comprises, in sequence from a front end 16 to a rear end 18, a front transverse support member 24 and a spaced apart rear transverse support member 34 which are interconnected by a central longitudinal interconnecting beam 40.

(a) the front flexible transverse support member 24 is a flexible oval sheet of material having a flexible upper portion 26 separated from a parallel flexible lower portion 28 and interconnected together by affixation members such as rivets or adhesive at locations 23 and 25. Alternatively, the front flexible transverse support member 24 is made of a single sheet of flexible material where the upper portion 26 is separated from the lower portion 28 by a gap 27. The gap 27 facilitates flexible up and down movement of the upper portion 26.

(b) the rear flexible transverse support member 34 is a flexible oval sheet of material having a flexible upper portion 36 separated from a parallel flexible lower portion 38 and interconnected together by affixation members such as rivets or adhesive at locations 33 and 35. Alternatively, the rear flexible transverse support member 34 is made of a single sheet of flexible material where the upper portion 36 is separated from the lower portion 38 by a gap 37. The gap 37 facilitates flexible up and down movement the upper portion 36.

(c) the intermediate beam 40 has a front end 42 with a front connecting plate 44. A pair of attaching bolts or rivets 41 and 43 affix front connecting plate 44 to upper portion 26 of front flexible support member 24. Similarly, interconnecting beam 40 has a rear end 46 with a rear connecting plate 48. A pair of attaching bolts or rivets 45 and 47 affix rear connecting plate 48 to upper portion 36 of rear flexible transverse support member 34.

Figure 13:
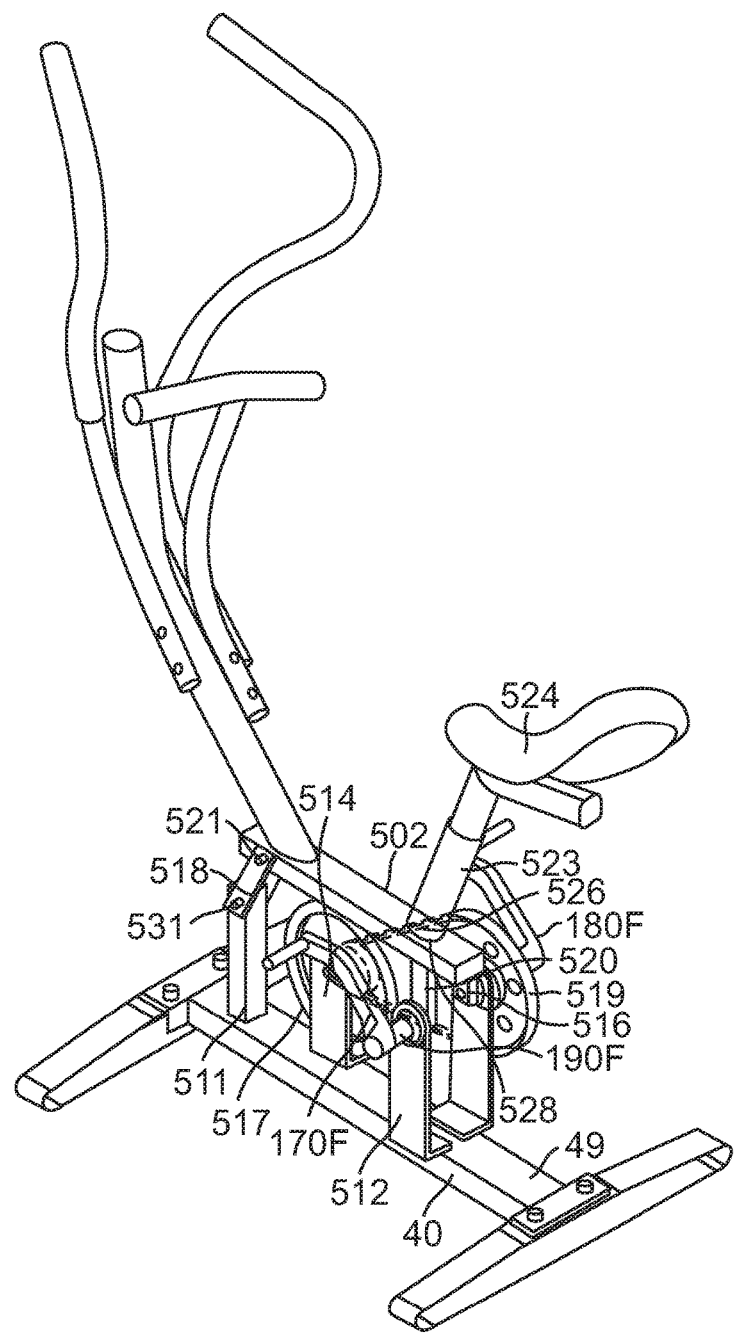
FIG. 13 is a left perspective view of the embodiment of the present invention illustrated in FIG. 1 with the body cover removed to illustrate one example of the internal operating compounds of the present invention.

2. A body 50 is affixed at a bottom longitudinal wall 52 to an upper surface 49 of the central longitudinal beam 40, the body 50 further comprising a first sidewall 54 and a spaced apart second sidewall 56 interconnected by bottom longitudinal wall 52, front wall 58, rear wall 60 and top wall 62. The bottom longitudinal wall 52, first sidewall 54, second sidewall 56, front wall 58, rear wall 60 and top wall 62 surround an interior chamber retaining operating components and resistance components, one example of which is illustrated in FIG. 13.

3. A first interconnecting member 70 includes a bottom wall 72 affixed to the top wall 62 of the body 50 (at a location adjacent the front wall 58), a circumferential sidewall 74 and a top wall 76.

(a) A central fixed vertically extending post 80 includes a lower straight section 82 extending toward the front 16 of the exercise apparatus 10, an arcuate section 84 and an upper straight section 86 extending toward the rear 18 of the exercise apparatus 10. The central fixed vertically extending post 80 is affixed through the top wall 76 and also affixed to a portion of the operating mechanism within body 50.

Figure 7:
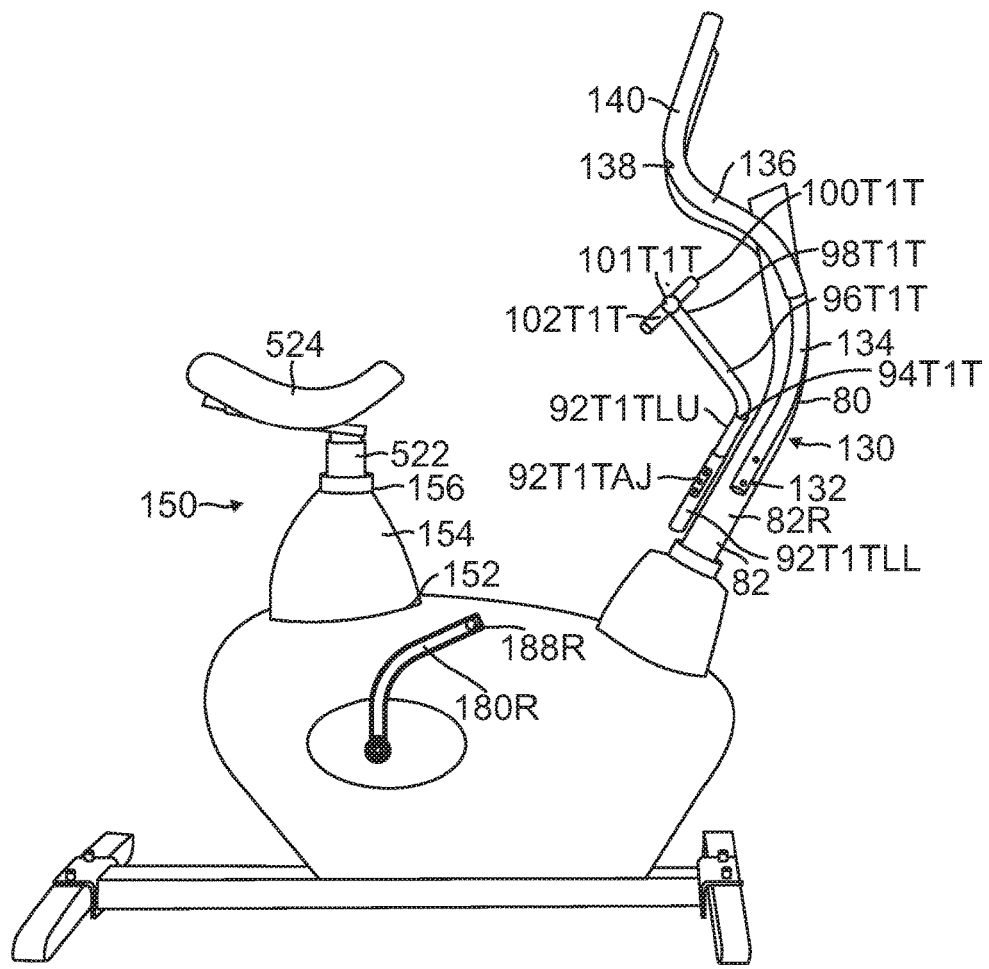
FIG. 7 is a right side-elevational view of the embodiment of the present invention illustrated in FIG. 1, but using an alternative curve crank and a first alternative horse riding simulation post.
Figure 8:
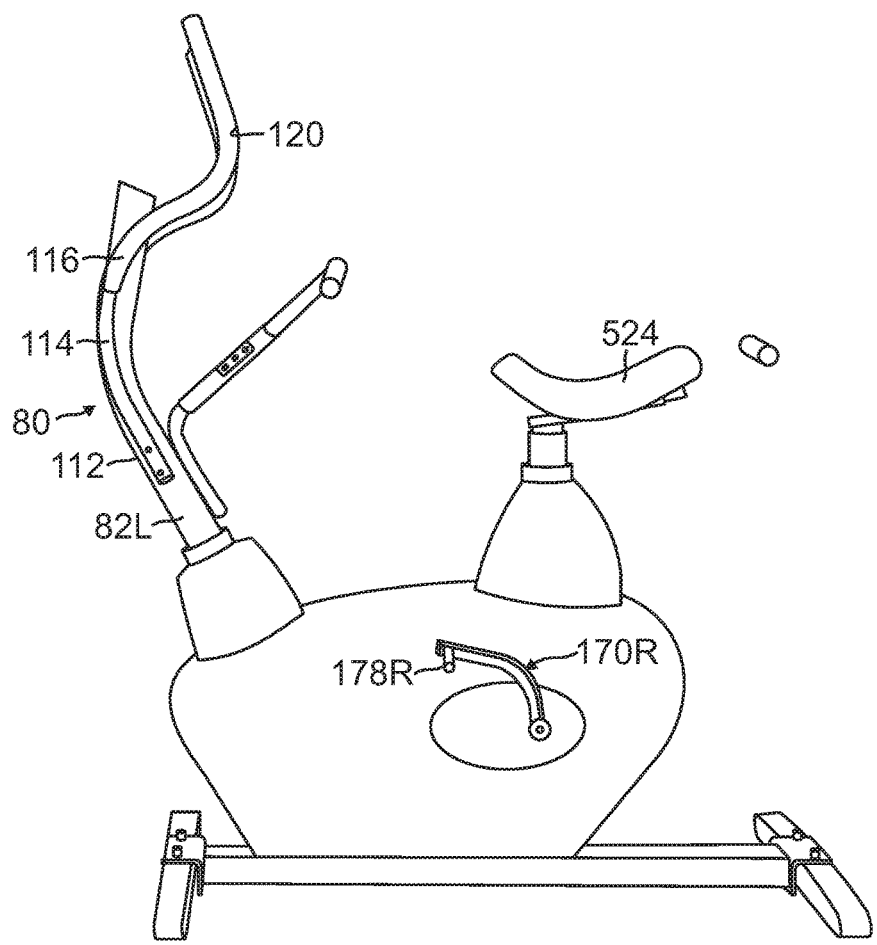
FIG. 8 is a left side-elevational view of the embodiment of the present invention illustrated in FIG. 1, but using an alternative curve crank and a second alternative horseback riding simulation post.
Figure 9:
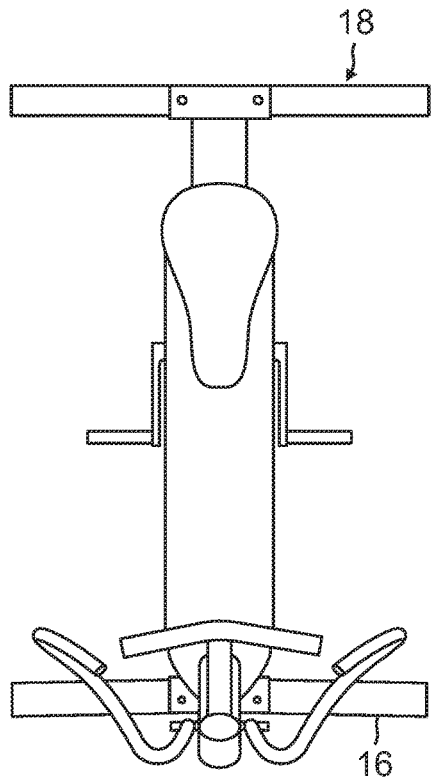
FIG. 9 is a top plan view of the embodiment of the present invention illustrated in FIG. 1.
Figure 10:
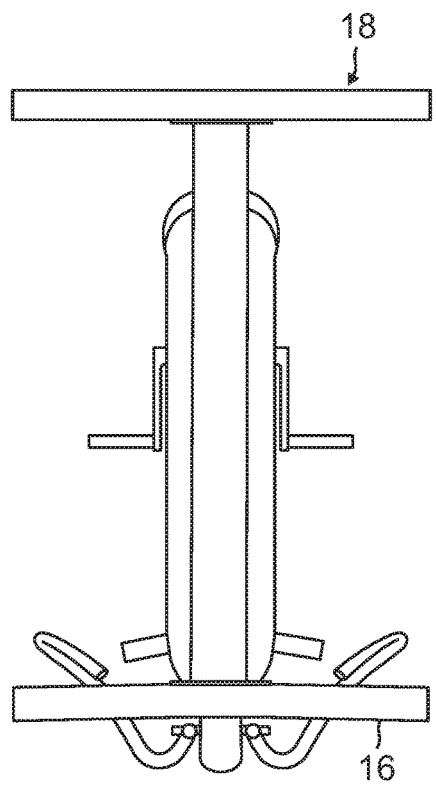
FIG. 10 is a bottom plan view of the embodiment of the present invention illustrated in FIG. 1.
Figure 11:
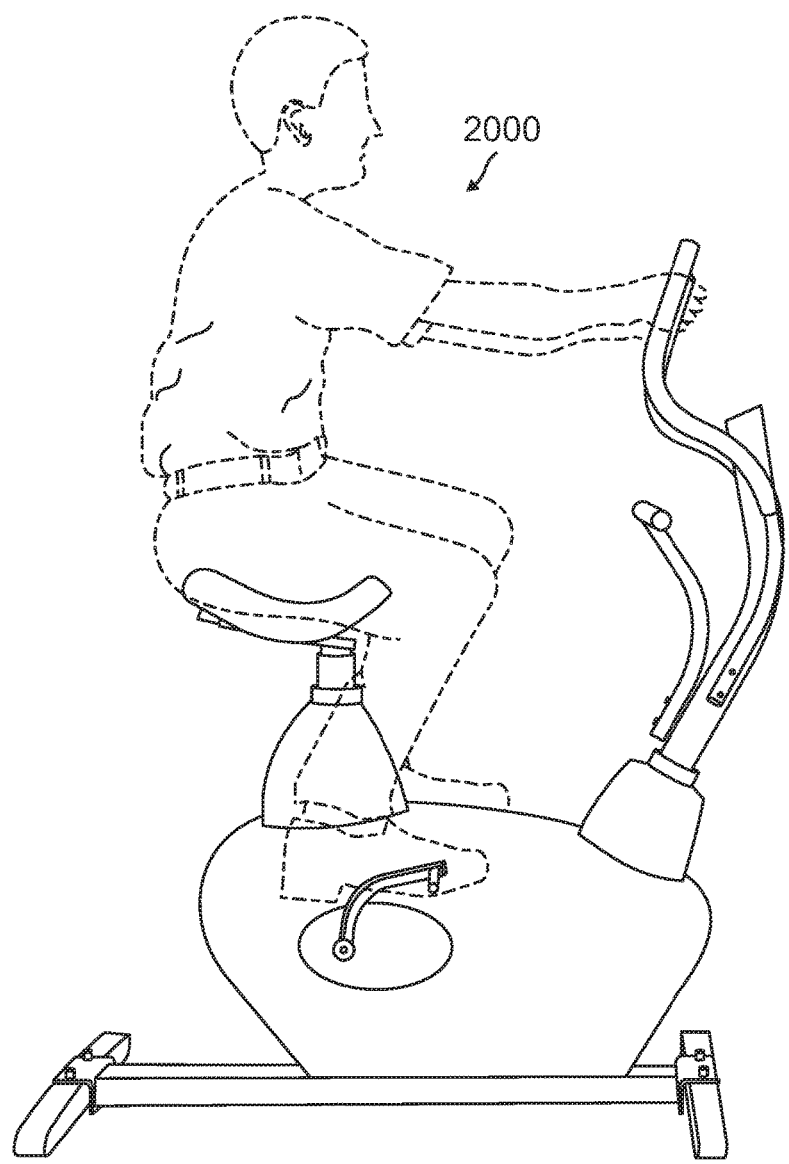
FIG. 11 is a left side-elevational view of the embodiment of the present invention illustrated in FIG. 1, illustrating a rider performing both an upper body and a lower body exercise.
Figure 12:
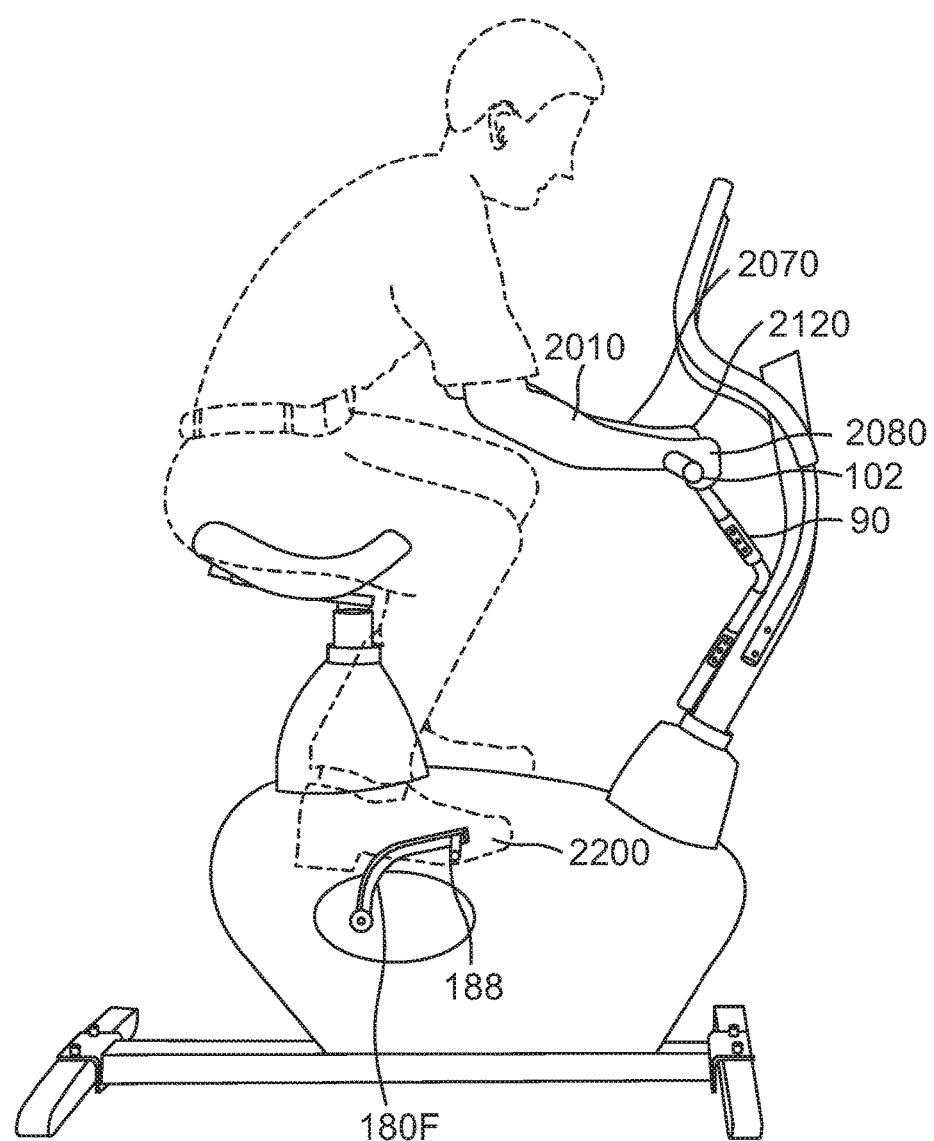
FIG. 12 is a left side-elevational view of the embodiment of the present invention illustrated in FIG. 1, illustrating a rider performing illustrating a rider performing a horseback riding, but using an alternative curve crank and a third alternative horseback riding simulation post.
Figure 14:
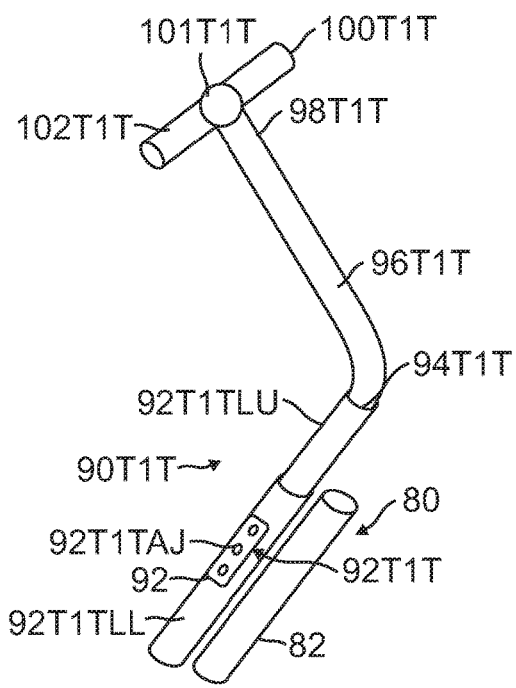
FIG. 14 is a side perspective view of a first alternative embodiment of the horseback riding simulation post with the bottom section having telescoping portions.

(b) Referring to FIGS. 1 to 4, and 14, the first embodiment of a horseback riding simulation post 90 includes a first straight lower section 92 affixed to and aligned with lower straight section 82 of central fixed vertically extending post 80. The first straight lower section 92 extends to an arcuate section 94 which extends to a second straight upper section 96 which extends vertically and horizontally toward the rear 18 of the exercise apparatus 10 and towards a seat on which a rider is seated. The distal end 98 of the second straight upper section 96 terminates in a transverse handle 101 having a right handle section 100 and a left handle section 102. While illustrated as one fixed piece, it will be appreciated that it is within the spirit and scope of the present invention as illustrated in FIGS. 7 and 14 for the horseback riding simulation post 90T1T to have a telescoping section in the first straight lower section 92T1T to vary the orientation of the horseback riding simulation post 90T1T relative to a seated rider and as illustrated in FIGS. 8 and 14, the horseback riding simulation post 90T2T has a telescoping section in the second straight upper section 96T2T to also vary the distance between the handle section 101 of the horseback riding simulation post 90T2T relative to a seated rider. The last embodiment 90T3T has both telescoping variations. The telescoping variations will be described in detailed when FIG. 14 will be discussed.

(c) A left fixed grasping post 110 includes a first lower fixed section 112 affixed to a left side 82L of lower straight section 82 of the central fixed vertically extending post 80. The lower fixed section 112 begins in a first straight portion 112 and extends to a first arcuate portion 114 which extends in the vertical and horizontal direction toward the rear 18 of the exercise apparatus 10, then extends to a second arcuate portion 116 which extends to a third arcuate section 118 which reverses the direction of the left fixed grasping post 110 and extends a grasping portion 120 which extends in a vertical and horizontal direction toward the front 16 of the exercise apparatus 10.

(d) similarly, a right fixed grasping post 130 includes a first lower fixed section 132 affixed to a right side 82R of lower straight section 82 of the central fixed vertically extending post 84. The lower fixed section 132 begins in a first straight portion 132 and extends to a first arcuate portion 134 which extends in the vertical and horizontal direction toward the rear 18 of the exercise apparatus 10, then extends to a second arcuate portion 136 which extends to a third arcuate portion 138 which reverses the direction of the right fixed grasping post 130 and extends to a second straight grasping portion 140 which extends in a vertical and horizontal direction toward the front 16 of the exercise apparatus 10.

4. A second interconnecting member 150 includes a bottom wall 152 affixed to the top wall 62 of the body 50 (at a location adjacent the rear wall 60 of the body 50), a circumferential sidewall 154 and a top wall 156. A central fixed vertical post 522 is affixed at one end to a top surface of the second interconnecting member 150 and its opposite end adjustably supports the bicycle seat 524.

5. Another unique feature of the present invention is a first embodiment of a pair of parallel arcuate forwardly extending crank arms 170F and 180F each terminating in a transverse pedal 178F and 188F (the alternative variations has a pair of rearwardly crank arms discussed in FIGS. 22 through 26);

(a) Referring to FIGS. 17 through 21, first or left arcuate forwardly extending crank arm 170F includes a first vertically extending and forwardly extending section 172F extending to a curved intermediate section 174F extending to a second vertically extending and horizontally extending section 176F extending in the direction of the front end 16 of the exercise apparatus 10 and terminating in a left transverse pedal plate 178F at its distal end 179F. The first arcuate forwardly extending crank arm 170F is spaced away from the first sidewall 54 of body 50 with left transverse foot pedal plate 178F extending away from first sidewall 54.

(b) Further referring to FIGS. 17 through 21, second or right arcuate forwardly extending crank arm 180F includes a first vertically extending and forwardly extending section 182F extending to a curved intermediate section 184F extending to a second vertically extending and horizontally extending section 186F extending in the direction of the front end 16 of the exercise apparatus 10 and terminating in a right transverse pedal plate 188F at its distal end 189F. The second arcuate forwardly extending crank arm 180F is spaced away from the second sidewall 56 of body 50 with right transverse foot pedal plate 188F extending away from sidewall 56.

(c) Left arcuate forwardly extending crank arm 170F and right arcuate forwardly extending crank arm 180F are connected together at respective proximal ends 171F and 181 of respective first vertically extending and forwardly extending sections 172F and 182F by a connecting bar 190.

Referring to FIG. 13, an example of an operating mechanism to operate the innovation of the present invention is disclosed. It will be appreciated that this is only one example of an operating mechanism to be used with the present invention. The key innovative features of the horseback riding simulation pole, the pair of fixed poles, and the seat with two arcuate movable crank arms and with transverse foot pedals are the unique features of the present invention and any mechanisms that will drive the foot pedals and create the resistance required are within the spirit and scope of the present invention.

By way of example only and referring to FIG. 13, there is illustrated the intersecting beam 40 and its upper surface 49. A front support 511 is in the form of an erect bar affixed to the upper surface 49 of cross beam 40 mounted on top of the cross-beam 40. a U-shaped mount 514 functions as a wheel support.

Finally, an additional spaced apart U-shaped mechanism affixed on opposite sides of the upper surface 49 of the intersecting beam 40 is a flywheel support member 514. The flywheel support 514 rotatably receives and supports a flywheel 517 which allows for adjustment of the damping resistance thereon. The rear support 512 has two spaced apart side boards, which are respectively and rotatably coupled to two arcuate forwardly extending crank arms 170F and 180F that extend in the same direction, whereby the two arcuate forwardly extending crank arms 170F and 180F which are simultaneously rotatable in the same rotational direction. The two arcuate forwardly extending crank arms 170F and 180F are respectively connected to connecting bar 190F. Also include are with rocker arms fixed thereto. The rocker arms 516 are respectively located inside the two side boards of the rear support 512. The connecting br 190F enables the crank arms to extend in the same direction. The arcuate forwardly extending crank arms 170F and 180F are set at a predetermined distance and arcuate angle with the connecting bar 190 and the rocker arms simultaneously rotating in unison therewith. The connecting bar 190F extends through the support 512. One of the arcuate forwardly extending movable crank arms 180F is provided with a drive wheel 519 outside the rear support 512 for simultaneous rotation in unison therewith. The drive wheel 519 drives simultaneous rotation of the flywheel 517 through a transmission assembly which can be for example a belt 526, a chain, or mated gears. Further, the front support 511 has an upper end rotatably coupled to a connection link 518 connected by rivets 521 and 531 of which an opposite end is rotatably coupled to a front end portion of the movable frame 502.

The movable frame 502 comprises a connection bar 520 which includes a seat bar 523 formed thereon close to the second pivot 528 on the rear of the seat thereof. The seat bar 523 is provided, on an upper end thereof, with a seat cushion 524 to allow a user to sit thereon.

Figure 2:
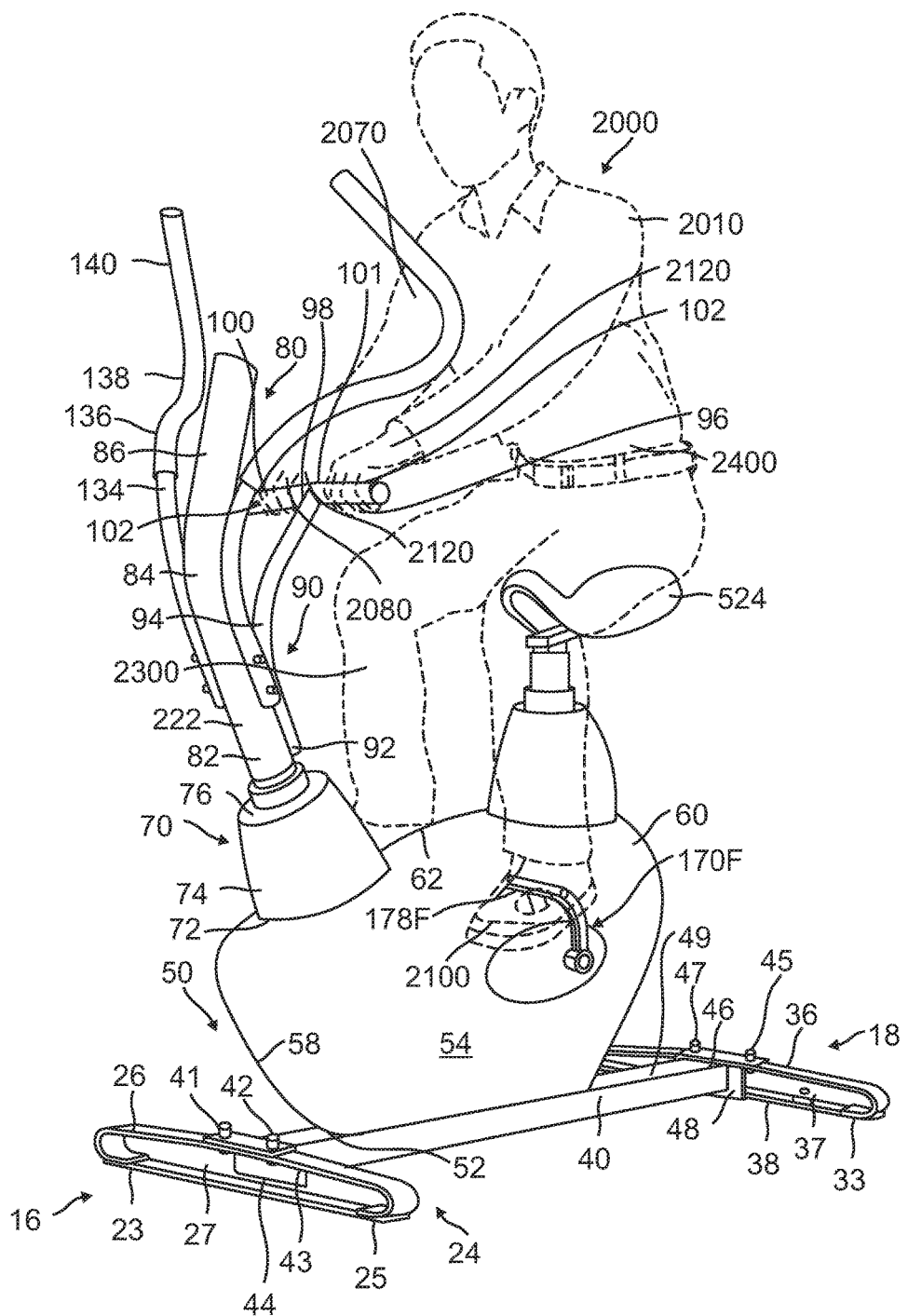
FIG. 2 is a left front perspective view of the embodiment of the present invention illustrated in FIG. 1, illustrating a rider performing a horseback riding exercise.
Figure 4:
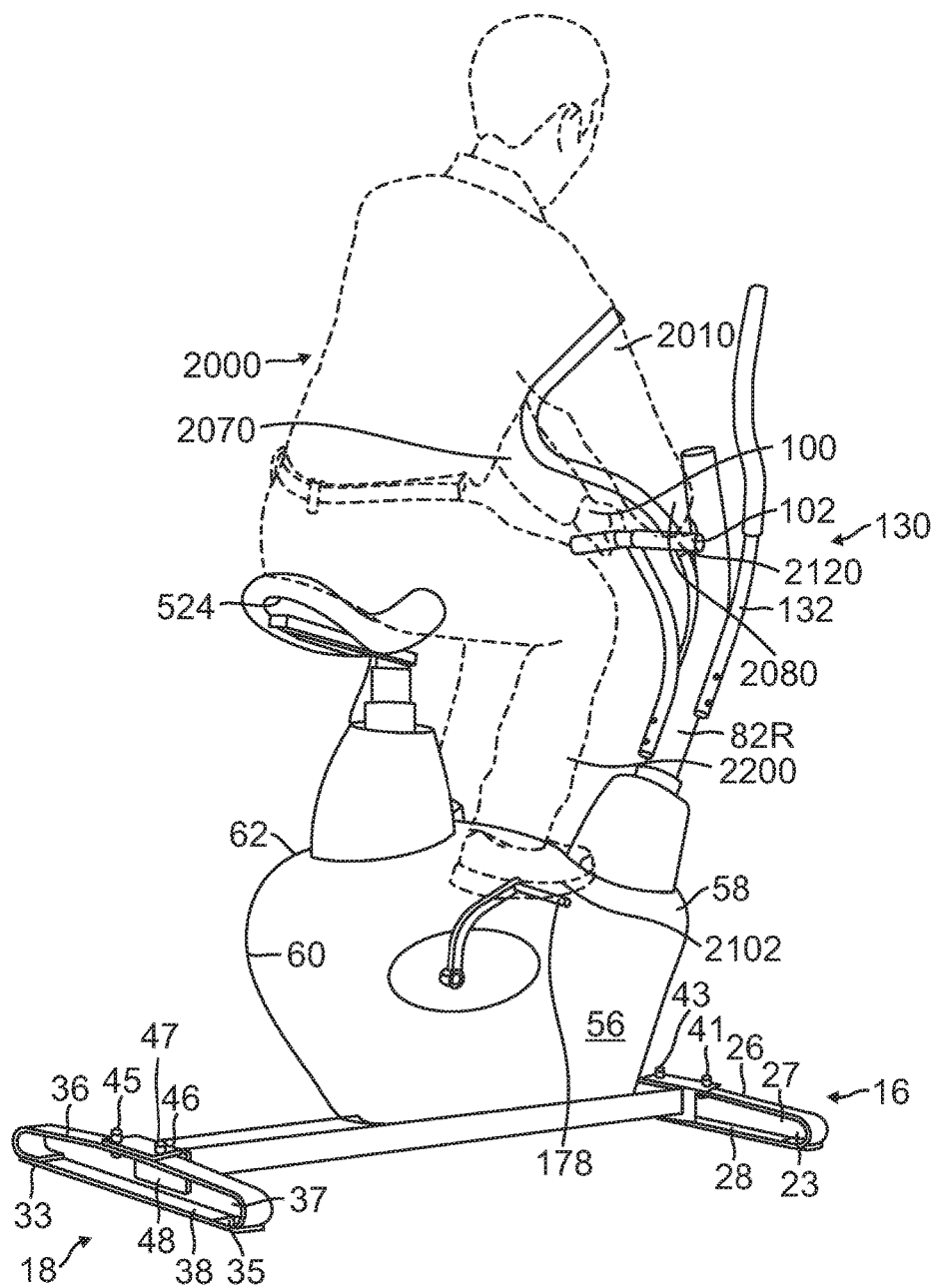
FIG. 4 is a right rear perspective view of the embodiment of the present invention illustrated in FIG. 1, illustrating a rider performing a horseback riding exercise.
Figure 5:
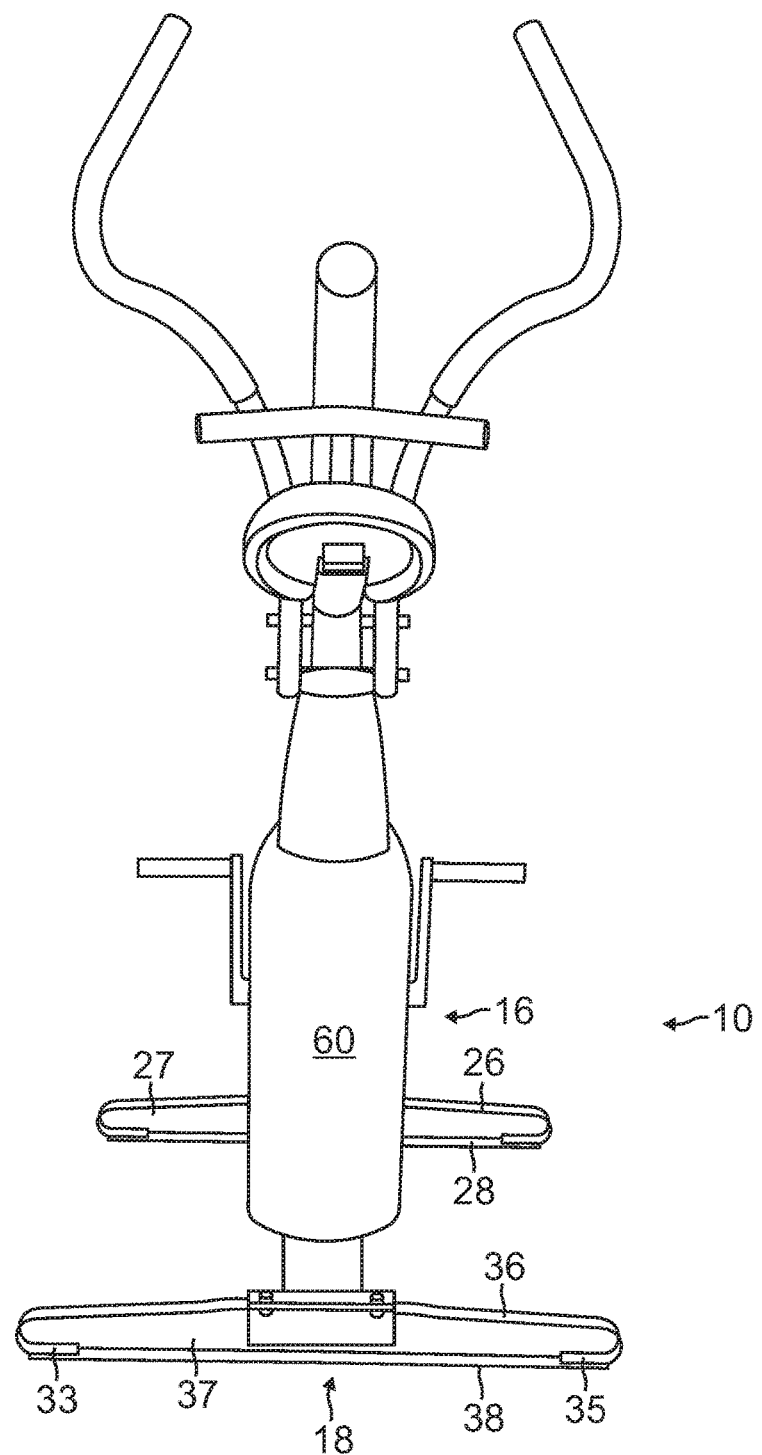
FIG. 5 is a rear elevational view of the embodiment of the present invention illustrated in FIG. 1.
Figure 6:
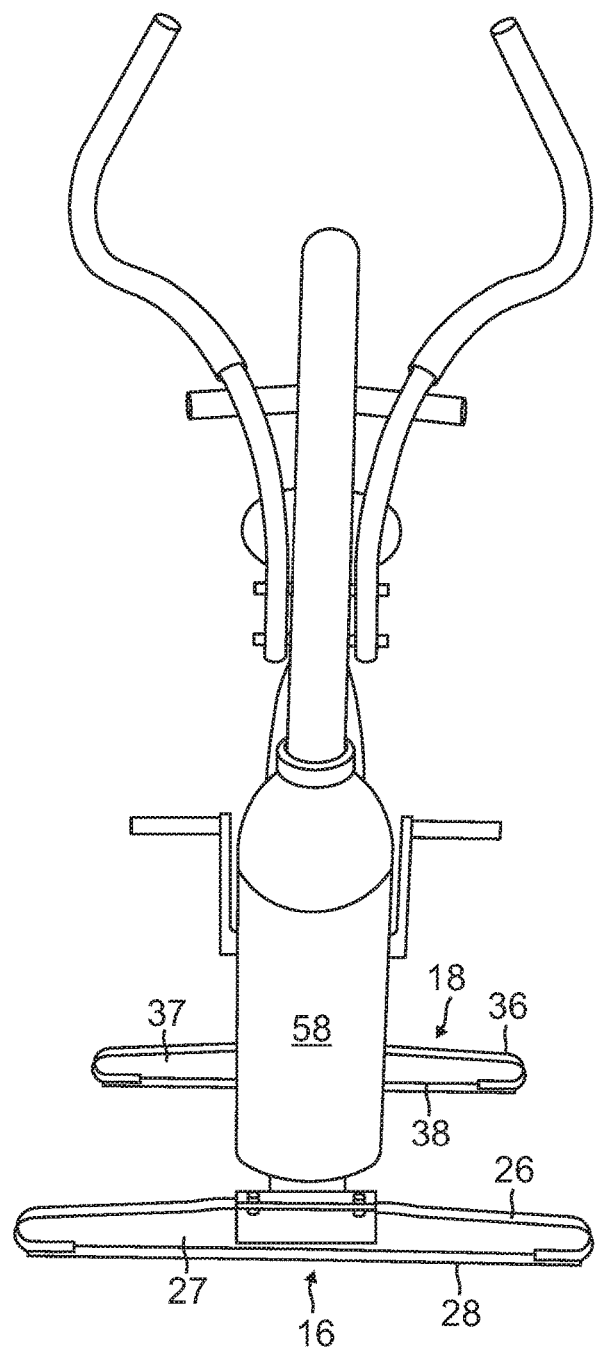
FIG. 6 is a front elevational view of the embodiment of the present invention illustrated in FIG. 1.

Referring to FIGS. 2 and 4, the exercise device simulates horseback riding as follows. Rider 2000 is seated on seat 524 and facing toward the front 16 of the exercise device. The rider 2000 extends his/her arms 2010 and 2070 so that the rider's left hand 2120 grasps left transverse handle 100 of horseback riding simulation post 90 and the rider's right hand 2080 grasps right transverse handle 102 of horseback riding simulation post 90. The rider pushes down on left transverse pedal plate 178 with the rider's left foot 2100 and pushes down on the right transverse foot pedal plate 188 with the rider's right foot 2200. The combination of the central horseback riding post 90, the two forwardly extending arcuate crank arms 170F and 180F and the hingable connection at the forward end of the post connecting beam create a horseback riding simulation effect. The flexible front transverse support member 24 and flexible upper portion 26 and flexible rear transverse support member 34 and upper section 36 further facilitates a faster horseback riding experience such as a canter or gallop. Through this portion of the exercise device 10, the rider 2000 exercises the rider's legs 2200 and 2300 and stomach 2400 while at the same time having an enjoyable horseback riding experience.

Figure 3:
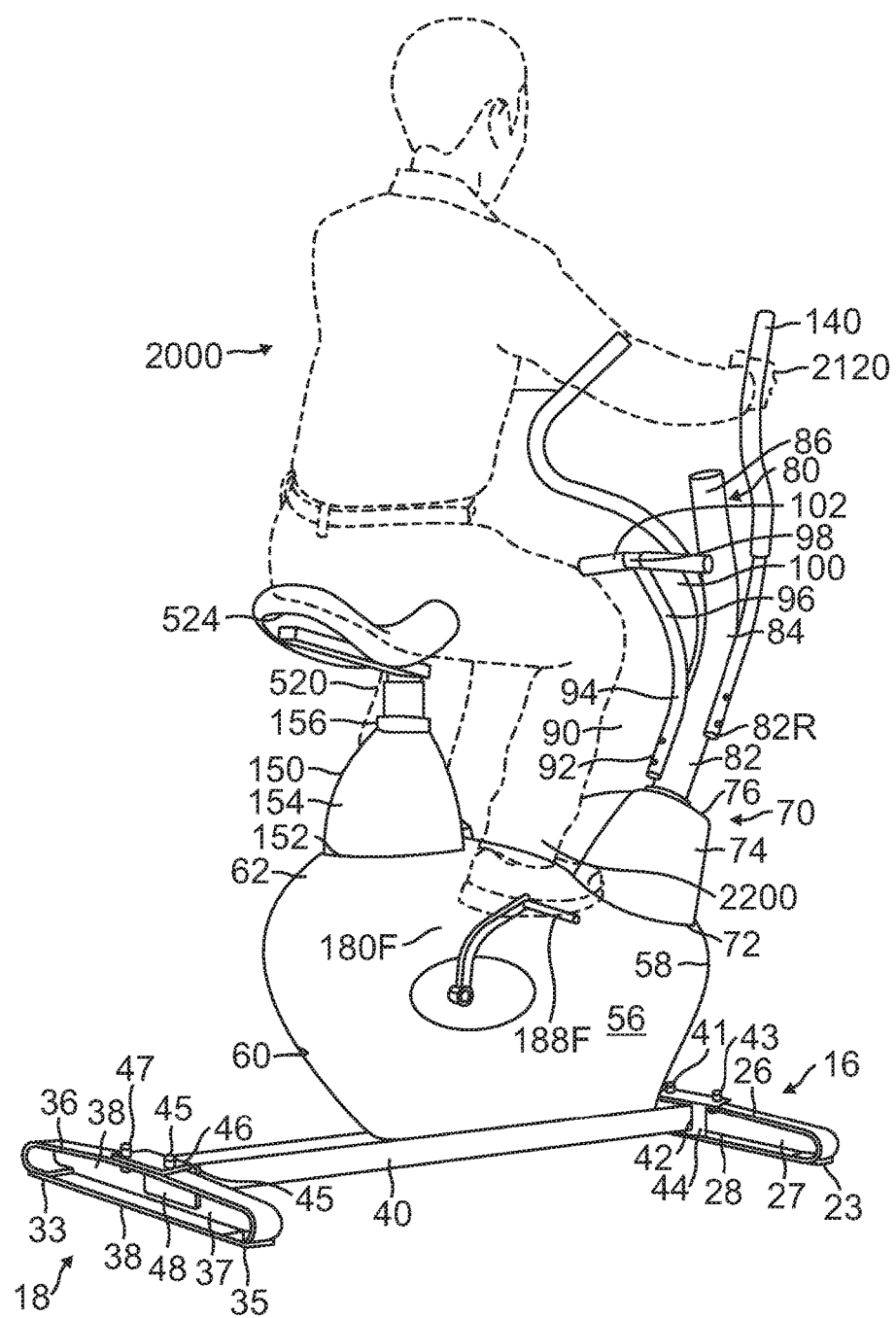
FIG. 3 is a right rear perspective view of the embodiment of the present intention illustrated in FIG. 1, illustrating a rider performing both an upper body and a lower body exercise.

In an alternative exercise, referring to FIGS. 1 and 3, the rider 2000 grasps the upper left grasping portion 120 of the left stationary post 110 with the rider's left hand 2120 and grasps the upper right grasping portion 140 of the right stationary post 130 with the rider's right hand 2080. With the rider pushing down on the pedals 178F and 188F of the arcuate forwardly extending 170F and 180H with the rider's feet and causing the rider's torso 2500 to rock back and forth due the arcuate forwardly extending crank arms facing forward which causes the rider to move back and forth while grasping the stationary post 110 and 130 thereby providing both upper body exercise including the rider's arms 2010 and 2070, torso 2500 and upper stomach muscles 2400 ands the rider's lower body including legs 2200 and 2300 and stomach muscles 2400.

One variation in the present invention illustrated in FIGS. 27 to 38 is to replace the front flexible support 24 with a fixed front transverse support 624 and the rear flexible support 34 with a fixed rear transverse support 634. Interconnecting beam 640 connects fixed transverse support 624 to rear fixed transverse support 634. The remaining components are the same and are numbered the same as the first embodiment.

The alternative variations of the remaining components will now be discussed. First, the variations on the simulation horseback riding post will be discussed. The three variations are illustrated in FIGS. 14, 15 and 16.

Referring to FIGS. 1, 7 and 14, the first variation 90T1T of the a horseback riding simulation post includes a first straight lower section 92T1T has a first lower section 92T1TLL affixed to and aligned with lower straight section 82 of central fixed vertically extending post 80 which receives telescoping upper section 92T1TLU. Adjustment means 92T1TAJ such as corresponding openings and a transverse pin enables variations is the extension of telescoping portion 92T1TLU to varying the orientation of the horseback riding simulation post 92T1T relative to the seated rider. The first straight lower section's telescoping portion 92T1TLU extends to an arcuate section 94T1T which extends to a second straight upper section 96T1T which extends vertically and horizontally toward the rear 18 of the exercise apparatus 10 and towards a seat on which a rider is seated. The distal end 98T1T of the second straight upper section 96T1T terminates in a transverse handle 101T1T having a right handle section 100T1T and a left handle section 102T1T.

Figure 15:
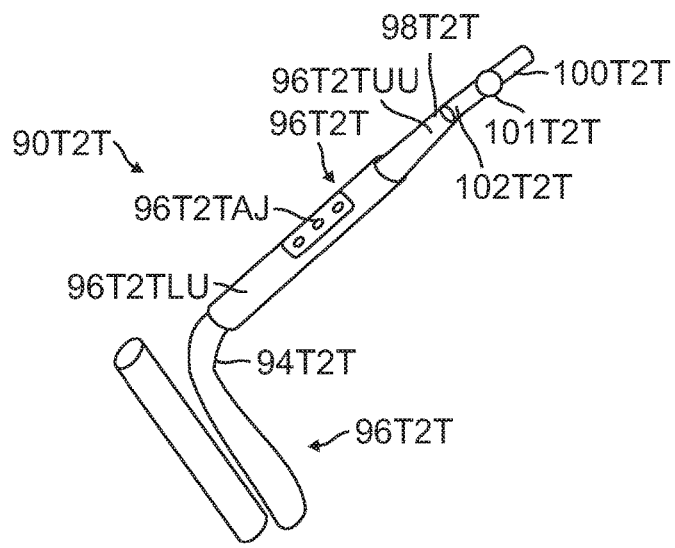
FIG. 15 is a side perspective view of a second alternative embodiment of the horseback riding simulation post with the upper section having telescoping portions.

Referring to FIGS. 8 and 15, the second variation 90T2T of the a horseback riding simulation post includes a first straight lower section 92T2 affixed to and aligned with lower straight section 82 of central fixed vertically extending post 80 and extends to an arcuate section 94T2T which extends to a second straight upper section 96T2T having a first lower section 92T2TLU affixed to the arcuate section 94T2T and which receives telescoping upper section 92T2TUU. Adjustment means 92T2TAJ such as corresponding openings and a transverse pin enables variations is the extension of telescoping portion 92T2TUU to varying the distance between the horseback riding simulation post 92T2T relative to the seated rider. The distal end 98T2T of the telescoping portion 92T2TUU of the second straight upper section 96TT terminates in a transverse handle 101T2T having a right handle section 100T2T and a left handle section 102T2T.

Figure 16:
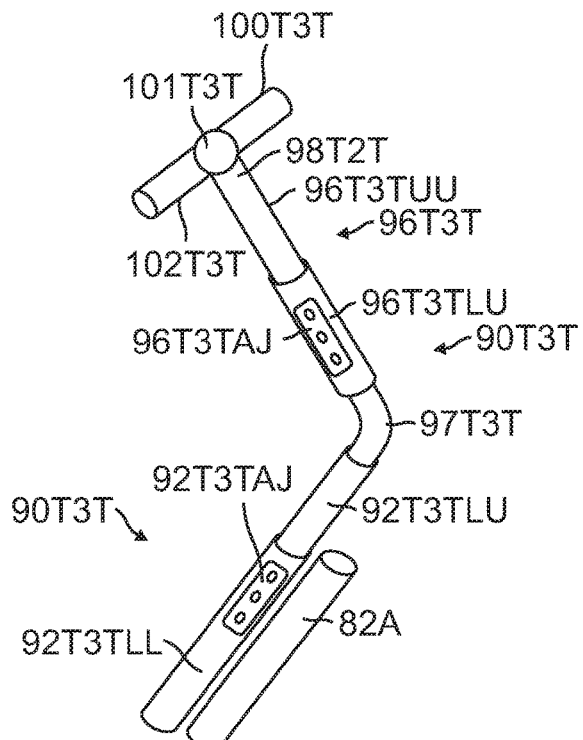
FIG. 16 is a side perspective view of a third alternative embodiment of the horseback riding simulation post with the bottom section having telescoping portions, and the upper section having telescoping portions.
Figure 17:
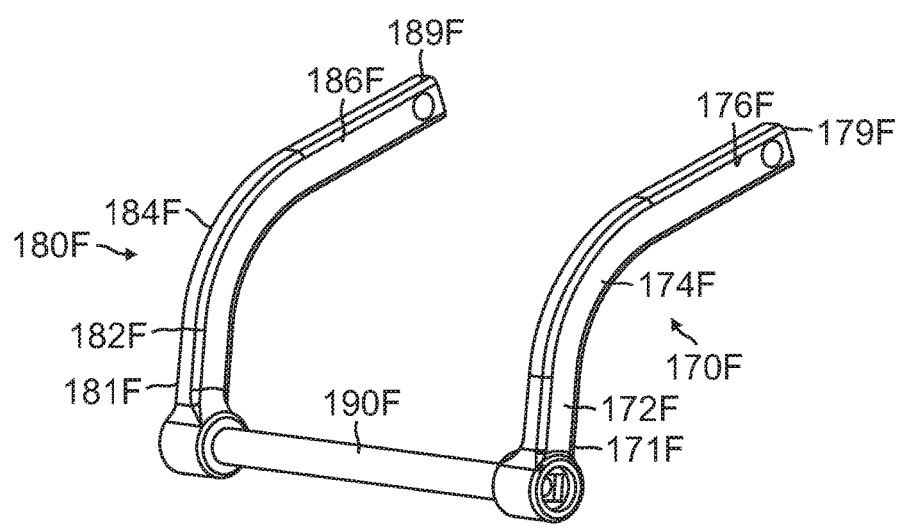
FIG. 17 is a rear perspective view of a first embodiment of a pair of parallel crank arms of the present invention with each crank arm having an upwardly extending section, and arcuate and forwardly extending section, and a connecting bar connecting the pair of crank arms together.
Figure 18:
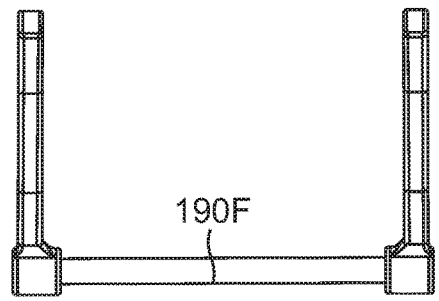
FIG. 18 is a top plan view of the pair of crank arms of the present invention illustrated in FIG. 17.
Figure 19:
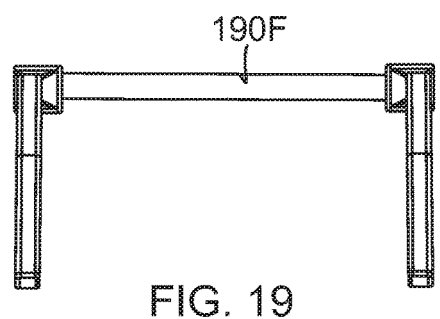
FIG. 19 is a bottom plan view of the pair of crank arms of the present invention illustrated in FIG. 17.
Figure 20:
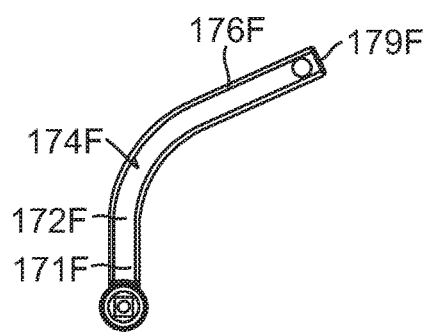
FIG. 20 is a side-elevational view with dimensions of one of the pair of crank arms of the present invention illustrated in FIG. 17.
Figure 21:
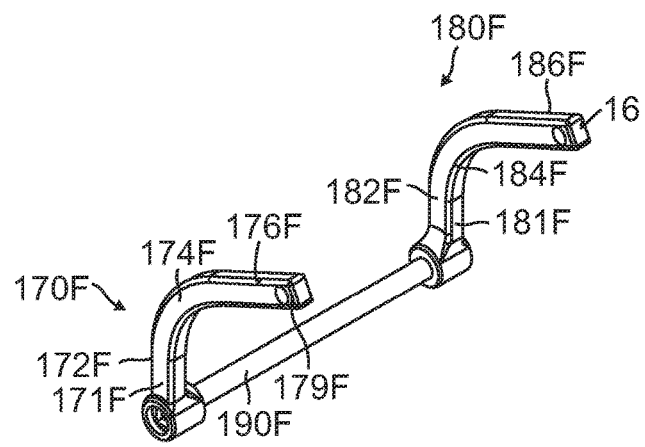
FIG. 21 is a front perspective view of the a pair of parallel pedals of the present invention with each crank arm having an upwardly extending section, and arcuate and forwardly extending section, and a connecting bar connecting the pair of crank arms together.
Figure 22:
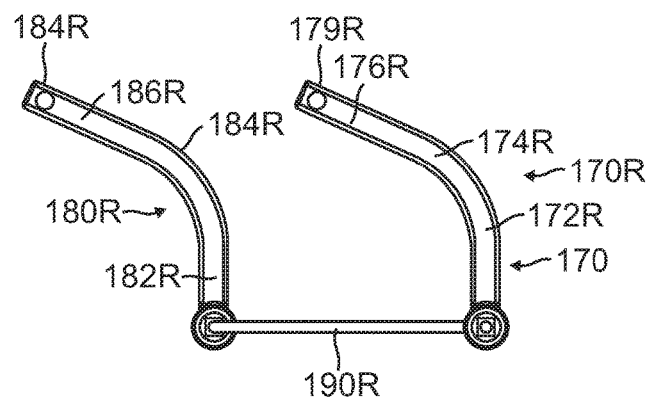
FIG. 22 is a rear perspective view of a second embodiment of a pair of parallel pedals of the present invention with each crank arm having an upwardly extending section, and arcuate and rearwardly extending section, and a connecting bar connecting the pair of crank arms together.
Figure 23:
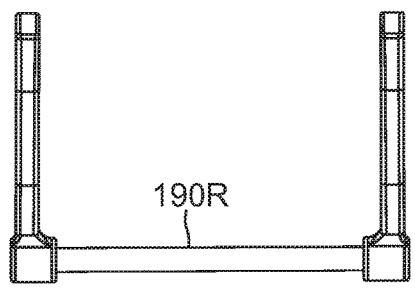
FIG. 23 is a top plan view of the pair of crank arms of the present invention illustrated in FIG. 22.
Figure 24:
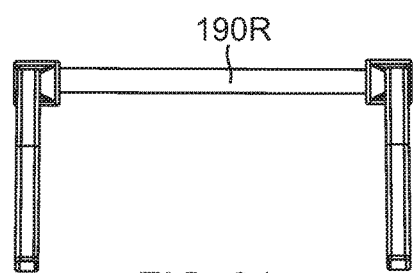
FIG. 24 is a bottom plan view of the pair of crank arms of the present invention illustrated in FIG. 22.
Figure 25:
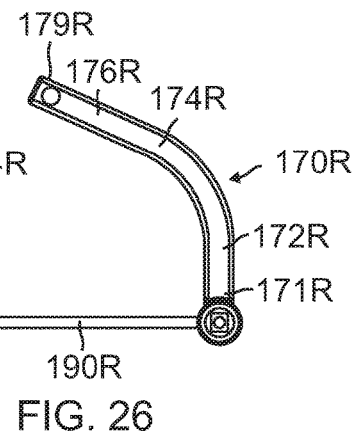
FIG. 25 is a side-elevational view with dimensions of one of the pair of crank arms of the present invention illustrated in FIG. 22.
Figure 26:
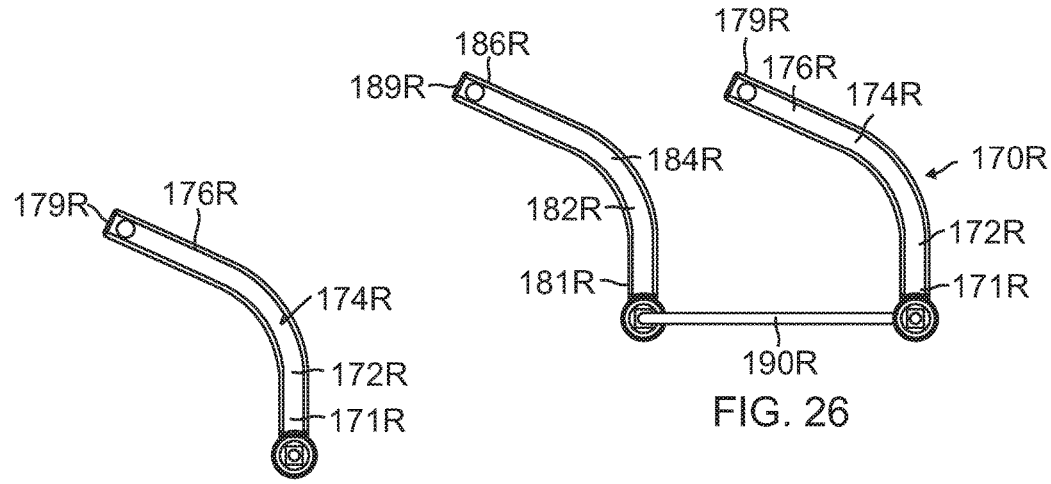
FIG. 26 is a front perspective view of the a pair of parallel pedals of the present invention with each crank arm having an upwardly extending section, and arcuate and forwardly extending section, and a connecting bar connecting the pair of crank arms together.

Referring to FIG. 16, the third variation 90T3T of the horseback riding simulation post includes a first straight lower section 92T3TLU having a first lower section 92T3TLL affixed to and aligned with lower straight section 82A of central fixed vertically extending post 80 and which receives telescoping upper section 96T3TLU. Adjustment means 96T3TAJ such as corresponding openings and a transverse pin enables variations in the extension of telescoping portion 96T3TLU to varying the orientation of the horseback riding simulation post relative to the rider. The distal end 98T3T of the telescoping portion 96T3TLU of the first straight upper section 96T3T extends to an arcuate section 94T3T which extends to a second straight upper section 96T3T having a first lower section 92T3TLU affixed to the arcuate section 94T3T and which receives telescoping upper section 92T3TUU. Adjustment means 92T3TAJ such as corresponding openings and a transverse pin enables variations is the extension of telescoping portion 92T3TUU to vary the distance between the horseback riding simulation post 90T3T relative to the seated rider. The distal end 98T3T of the telescoping portion 92T3TUU of the second straight upper section 96T3T terminates in a transverse handle 101T3T having a right handle section 100T3T and a left handle section 102T3T.

The variation of another of the unique features of the present invention is a second embodiment of a pair of parallel arcuate rearwardly extending crank arms 170R and 180R each terminating in a transverse pedal 178R and 188R is illustrated in FIGS. 22 through 26. The first or left arcuate rearwardly extending crank arm 170R includes a first vertically extending and rearwardly extending section 172R extending to a curved intermediate section 174R extending to a second vertically extending and horizontally extending section 176R extending in the direction of the front end 16 of the exercise apparatus 10 and terminating in a left transverse pedal plate 178R at its distal end 179R. The first arcuate forwardly extending crank arm 170R is spaced away from the first sidewall 54 of body 50 with left transverse foot pedal plate 178R extending away from first sidewall 54. Further referring to FIGS. 22 through 26, second or right arcuate rearwardly extending crank arm 180R includes a first vertically extending and rearwardly extending section 182R extending to a curved intermediate section 184R extending to a second vertically extending and horizontally extending section 186R extending in the direction of the front end 16 of the exercise apparatus 10 and terminating in a right transverse pedal plate 188R at its distal end 189R. The second arcuate rearwardly extending crank arm 180R is spaced away from the second sidewall 56 of body 50 with right transverse foot pedal plate 188R extending away from sidewall 56. The left arcuate rearwardly extending crank arm 170T and right arcuate forwardly extending crank arm 180R are connected together at respective proximal ends 171R and 181R of respective first vertically extending and forwardly extending sections 172R and 182R by a connecting bar 190R.

In another variation of a unique feature of the present invention is that the left fixed grasping post 110 and right fixed grasping post 130 are interconnected by interconnecting member 129 as illustrated in FIG. 1 to be an integral unit.

Another unique feature of the present invention is a third embodiment of a pair of parallel arcuate downwardly extending crank arms 1170F and 1180F each terminating in a pedal;

(a) Referring to FIGS. 39 through 43, third or left modified arcuate downwardly extending crank arm 1170F includes a first downwardly extending section 1172F extending to a curved intermediate section 1174F extending to a second downwardly extending and horizontally extending section 1176F extending in the direction of the front end 16 of the exercise apparatus 10 and terminating in a left pedal at its distal end 1179F. The third arcuate downwardly extending crank arm 1170F is spaced away from the first or left sidewall 54 of body 50 with left foot pedal 1178F extending away from first or left sidewall 54. The left foot pedal is a transverse bar 1170E-BR (see FIG. 40) or a plate 1170F-PL with a strap 1170F-S (see FIG. 39).

(b) Further referring to FIGS. 39-43, second or right modified arcuate downwardly extending crank arm 1180F includes a first downwardly extending section 1182F extending to a curved intermediate section 1184F extending to a second downwardly extending and horizontally extending section 1186F extending in the direction of the front end 16 of the exercise apparatus 10 and terminating in a right foot pedal at its distal end 1189R. The second or right arcuate downwardly extending crank arm 1180F is spaced away from the second or right sidewall 56 of body 50 with right foot pedal 1188F extending away from sidewall 56. The right foot pedal is a transverse bar 1180R-BR (see FIG. 40) or a plate 1180F-PL with a strap 1180F-S (see FIG. 39).

(c) Left modified arcuate downwardly extending crank arm 1170F and right modified arcuate downwardly extending crank arm 1180F are connected together at respective proximal ends 1171F and 1111F by a connecting bar 1190F.

Another unique feature of the present invention is a fourth embodiment of a pair of parallel arcuate downwardly extending crank arms 1170R and 1180R each terminating in a pedal;

(a) Referring to FIGS. 44 through 48, fourth or left modified arcuate downwardly extending crank arm 1170R includes a first downwardly extending section 1172R extending to a curved intermediate section 1174R extending to a second downwardly extending and horizontally extending section 1176R extending in the direction of the rear end 18 of the exercise apparatus 10 and terminating in a left pedal at its distal end 1179R. The forth arcuate downwardly extending crank arm 1170R is spaced away from the first or left sidewall 54 of body 50 with left foot pedal extending away from first or left sidewall 54. The left foot pedal is a transverse bar 1170R-BR (see FIG. 45) or a plate 1170R-PL with a strap 1170R-S (see FIG. 44).

(b) Further referring to FIGS. 44-48, second or right modified arcuate downwardly extending crank arm 1180R includes a first downwardly extending section 1182R extending to a curved intermediate section 1184R extending to a second downwardly extending and horizontally extending section 1186R extending in the direction of the rear end 18 of the exercise apparatus 10 and terminating in a right foot pedal at its distal end 1189R. The second or right arcuate downwardly extending crank arm 1180R is spaced away from the second or right sidewall 56 of body 50 with the right foot pedal extending away from sidewall 56. The right foot pedal is a transverse bar 1180R-BR (see FIG. 45) or a plate 1180R-PL with a strap 1180R-S (see FIG. 45).

(c) Left modified arcuate downwardly extending crank arm 1170R and right modified arcuate downwardly extending crank arm 1180R are connected together at respective proximal ends 1171R and 1111R by a connecting bar 1190R.

In addition to the crank arms previously discussed, it is also within the spirit and scope of the present 5 invention for the crank arms to be straight so that an interconnection bar connects a left straight crank arm on one side off the exercise machine to a right straight crank arm on the opposite side of the mach. Each crank arm has a pedal at its distal end and the motion is circular. The connecting bar is connected to a flywheel and then to a resistance wheel in the form previously discussed.

Referring to FIG. 49, there is illustrated is a front view of a fifth variation of a pair a crank arms 2180 where both crank arms 2180L and 2180R area straight, each respective crank arm 2180L and 2180R having a pedal plate 2170L-PL; and 2180R-PL and a strap 2180L-S and 2180R-S at a respective distal end 2181LD and 2181RD. The crank arms 2180L and 2180R are connected by a pedal bar, 2190 at their respective proximal end 2181LP and 2181RP and the crank arms are on opposite sides of the exercise device and the crank arms extend in the same direction.

Referring to FIG. 50, there is illustrated is a front view of a sixth variation of a pair a crank arms 3180 where both crank arms 3180L and 3180R area straight, each respective crank arm 3180L and 3180R having a transverse rod pedal 3180L-R and 3180R-R at a respective distal end 3181L and 3181R. The crank arms 3180L and 3180R are connected by a pedal bar, 3190 at their respective proximal end 3181LP and 3181RP and the crank arms are on opposite sides of the exercise device and the crank arms extend in the same direction.

Referring to FIG. 51, there is illustrated is a front view of a seventh variation of a pair a crank arms 4180 where both crank arms 4180L and 4180R area straight, each respective crank arm 4180L and 4180R having a pedal plate 4170L-PL; and 4180R-PL and a strap 4180L-S and 4180R-S at a respective distal end 4181LD and 4181RD. The crank arms 4180L and 4180R are connected by a pedal bar, 4190 at their respective proximal end 4181LP and 4181RP and the crank arms are on opposite sides of the exercise device and the crank arms extend in opposite direction.

Figure 52:
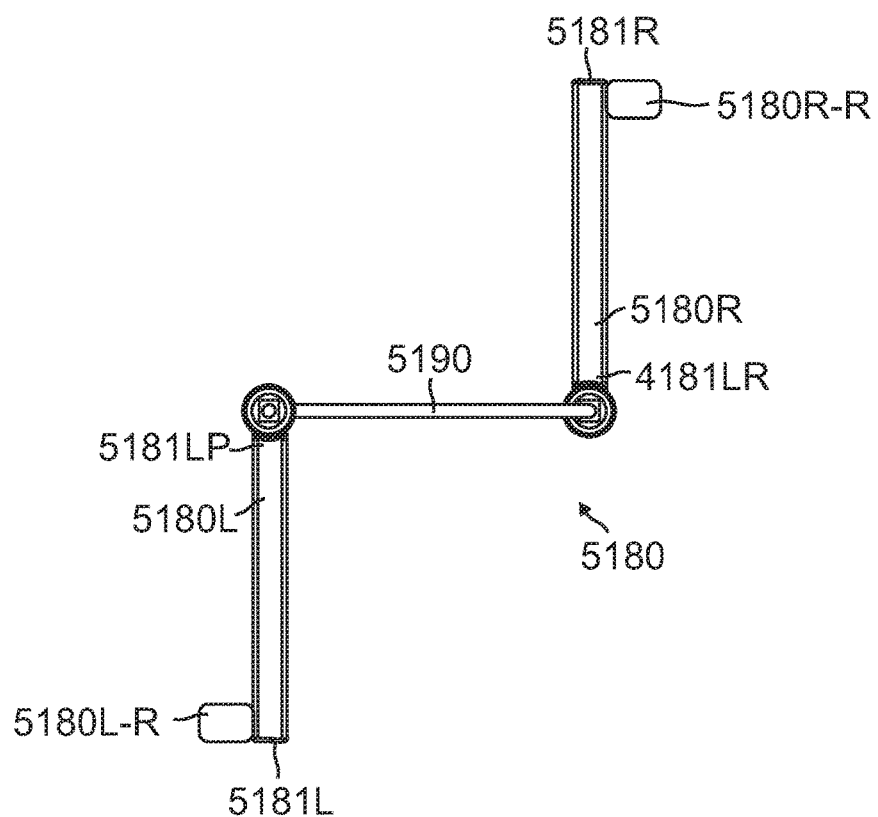
FIG. 52 is a front view of a fifth variation of a pair a crank arms where both crank arms a straight, each respective crank arm having a transverse rod for a pedal at a respective distal end, the crank arms are connected by a pedal bar, and the crank arms are on opposite sides of the exercise device and the crank arms extend in opposite directions.

Referring to FIG. 52, there is illustrated is a front view of an eighth variation of a pair a crank arms 5180 where both crank arms 5180L and 5180R area straight, each respective crank arm 5180L and 5180R having a transverse rod pedal 5180L-R and 5180R-R at a respective distal end 5181L and 5181R. The crank arms 5180L and 5180R are connected by a pedal bar, 5190 at their respective proximal end 5181LP and 5181RP and the crank arms are on opposite sides of the exercise device and the crank arms extend in opposite direction.

Figure 53:
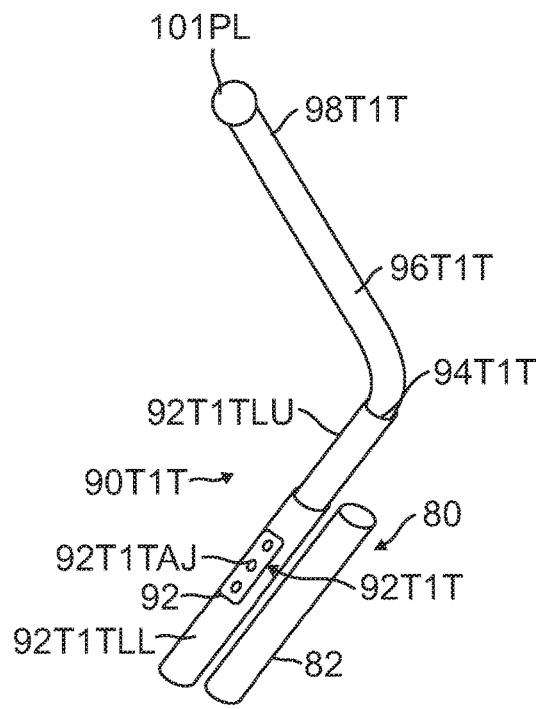
FIG. 53 is a side perspective view of a third alternative embodiment of the horseback riding simulation post with the lower section having telescoping portions and a plain handle at the distal end of the upper section.

Referring to FIG. 53, there is illustrated is a side perspective view of a third alternative embodiment of the horseback riding simulation post with the lower section having telescoping portions and a plain handle PL at the distal end of the upper section. Except for the plain handle 101PL, the parts are numbered the same as in FIG. 14.

Figure 54:
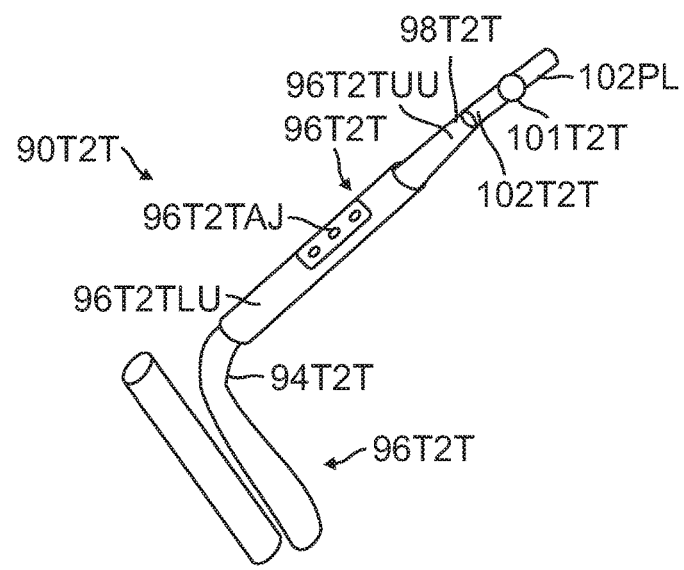
FIG. 54 is a side perspective view of a fourth alternative embodiment of the horseback riding simulation post with the upper section having telescoping portion and the upper section having a plain handle at the distal end.

Referring to FIG. 54, there is illustrated a side perspective view of a fourth alternative embodiment of the horseback riding simulation post with the upper section having telescoping portion and the upper section having a plain handle 102PL at the distal end of the upper section. Except for the plain handle 102PL, the parts are numbered the same as in FIG. 15.

Figure 55:
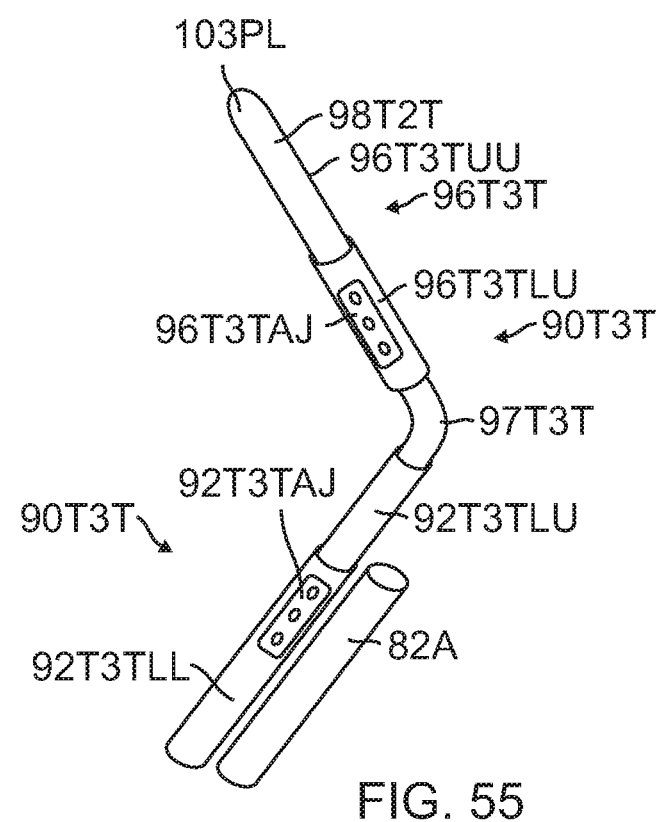
FIG. 55 is a side perspective view of a fifth alternative embodiment of the horseback riding simulation post with both the lower section and the upper section both having telescoping portions and the upper section having a plain handle at the distal end.

Referring to FIG. 55, there is illustrated is a side perspective view of a fifth alternative embodiment of the horseback riding simulation post with both the lower section and the upper section both having telescoping portions and the upper section having a plain handle 103PL at the distal end of the upper section. Except for the plain handle 103PL the parts are numbered the same as in FIG. 16.

Figure 56:
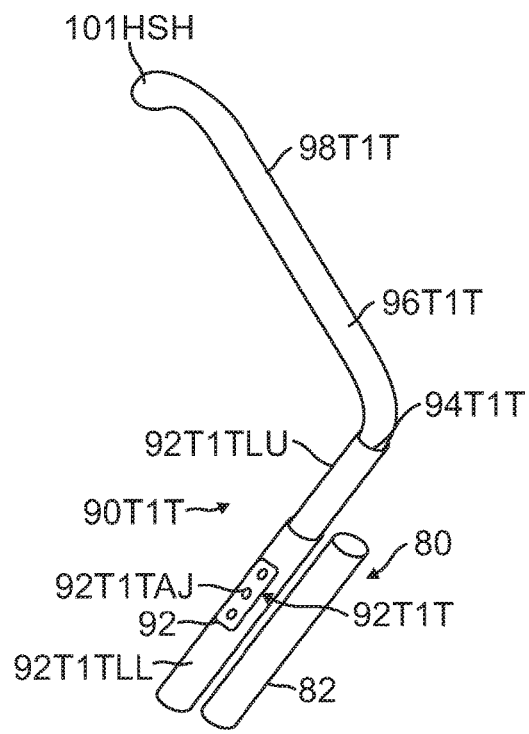
FIG. 56 is a side perspective view of a sixth alternative embodiment of the horseback riding simulation post with the lower section having telescoping portions and a horseback saddle handle at the distal end of the upper section.

Referring to FIG. 56, there is illustrated is a side perspective view of a sixth alternative embodiment of the horseback riding simulation post with the lower section having telescoping portions and a horseback saddle handle 101HBH at the distal end of the upper section. Except for the horseback saddle handle 101HSH, the parts are numbered the same as in FIG. 14.

Figure 57:
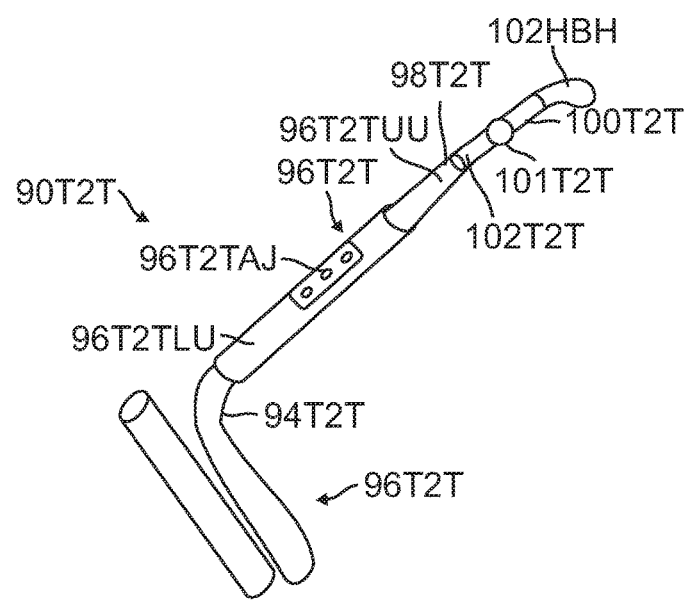
FIG. 57 is a side perspective view of a seventh alternative embodiment of the horseback riding simulation post with the upper section having telescoping portion and the upper section having a horseback saddle handle at the distal end.

Referring to FIG. 57, there is illustrated a side perspective view of a seventh alternative embodiment of the horseback riding simulation post with the upper section having telescoping portion and the upper section having a horseback saddle handle 102HSH at the distal end of the upper section. Except for the horseback saddle handle 102HSH, the parts are numbered the same as in FIG. 15.

Figure 58:
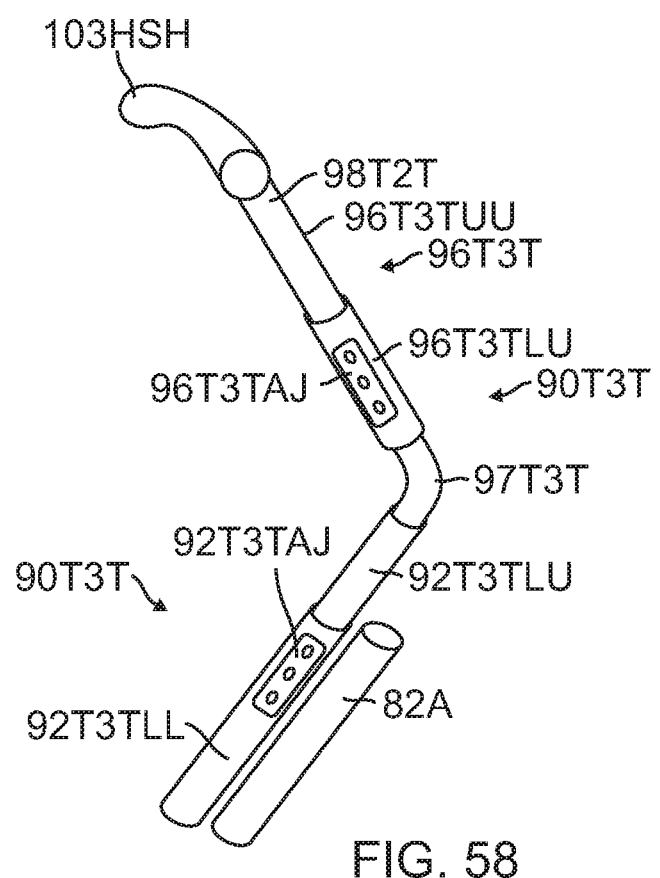
FIG. 58 is a side perspective view of a eighth alternative embodiment of the horseback riding simulation post with the lower section and the upper section both having telescoping portions and the upper section having a horseback saddle handle at the distal end.

Referring to FIG. 58, there is illustrated is a side perspective view of an eighth alternative embodiment of the horseback riding simulation post with both the lower section and the upper section both having telescoping portions and the upper section having ah horseback saddle handle 103HSH at the distal end of the upper section. Except for the horseback saddle handle 103HSH, the parts are numbered the same as in FIG. 16.

Referring to FIG. 13, an example of an operating mechanism to operate the innovation of the present invention is disclosed. It will be appreciated that this is only one example of an operating mechanism to be used with the present invention. The key innovative features of the horseback riding simulation pole, the pair of fixed poles, and the seat with two arcuate movable crank arms and with transverse foot pedals are the unique features of the present invention and any mechanisms that will drive the foot pedals and create the resistance required are within the spirit and scope of the present invention.

By way of example only and referring to FIG. 13, there is illustrated the intersecting beam 40 and its upper surface 49. A front support 511 is in the form of an erect bar affixed to the upper surface 49 of cross beam 40 mounted on top of the cross-beam 40. A U-shaped mount 514 functions as a wheel support.

Finally, an additional spaced apart U-shaped mechanism affixed on opposite sides of the upper surface 49 of the intersecting beam 40 is a flywheel support member 514. The flywheel support 514 rotatably receives and supports a flywheel 517 which allows for adjustment of the damping resistance thereon. The rear support 512 has two spaced apart side boards, which are respectively and rotatably coupled to two arcuate forwardly extending crank arms 170F and 180F that extend in the same direction, whereby the two arcuate forwardly extending crank arms 170F and 180F which are simultaneously rotatable in the same rotational direction. The two arcuate forwardly extending crank arms 170F and 180F are respectively connected to connecting bar 190F. Also include are with rocker arms fixed thereto. The rocker arms 516 are respectively located inside the two side boards of the rear support 512. The connecting br 190F enables the crank arms to extend in the same direction. The arcuate forwardly extending crank arms 170F and 180F are set at a predetermined distance and arcuate angle with the connecting bar 190 and the rocker arms simultaneously rotating in unison therewith. The connecting bar 190F extends through the support 512. One of the arcuate forwardly extending movable crank arms 180F is provided with a drive wheel 519 outside the rear support 512 for simultaneous rotation in unison therewith. The drive wheel 519 drives simultaneous rotation of the flywheel 517 through a transmission assembly which can be for example a belt 526, a chain, or mated gears. Further, the front support 511 has an upper end rotatably coupled to a connection link 518 connected by rivets 521 and 531 of which an opposite end is rotatably coupled to a front end portion of the movable frame 502.

The movable frame 502 comprises a connection bar 520 which includes a seat bar 523 formed thereon close to the second pivot 528 on the rear of the seat thereof. The seat bar 523 is provided, on an upper end thereof, with a seat cushion 524 to allow a user to sit thereon.

Referring to FIGS. 2 and 4, the exercise device simulates horseback riding as follows. Rider 2000 is seated on seat 524 and facing toward the front 16 of the exercise device. The rider 2000 extends his/her arms 2010 and 2070 so that the rider's left hand 2120 grasps left transverse handle 100 of horseback riding simulation post 90 and the rider's right hand 2080 grasps right transverse handle 102 of horseback riding simulation post 90. The rider pushes down on left transverse pedal plate 178 with the rider's left foot 2100 and pushes down on the right transverse foot pedal plate 188 with the rider's right foot 2200. The combination of the central horseback riding post 90, the two forwardly extending arcuate crank arms 170F and 180F and the hingable connection at the forward end of the post connecting beam create a horseback riding simulation effect. The flexible front transverse support member 24 and flexible upper portion 26 and flexible rear transverse support member 34 and upper section 36 further facilitates a faster horseback riding experience such as a canter or gallop. Through this portion of the exercise device 10, the rider 2000 exercises the rider's legs 2200 and 2300 and stomach 2400 while at the same time having an enjoyable horseback riding experience.

In an alternative exercise, referring to FIGS. 1 and 3, the rider 2000 grasps the upper left grasping portion 120 of the left stationary post 110 with the rider's left hand 2120 and grasps the upper right grasping portion 140 of the right stationary post 130 with the rider's right hand 2080. With the rider pushing down on the pedals 178F and 188F of the arcuate forwardly extending 170F and 180H with the rider's feet and causing the rider's torso 2500 to rock back and forth due the arcuate forwardly extending crank arms facing forward which causes the rider to move back and forth while grasping the stationary post 110 and 130 thereby providing both upper body exercise including the rider's arms 2010 and 2070, torso 2500 and upper stomach muscles 2400 ands the rider's lower body including legs 2200 and 2300 and stomach muscles 2400.

Figure 27:
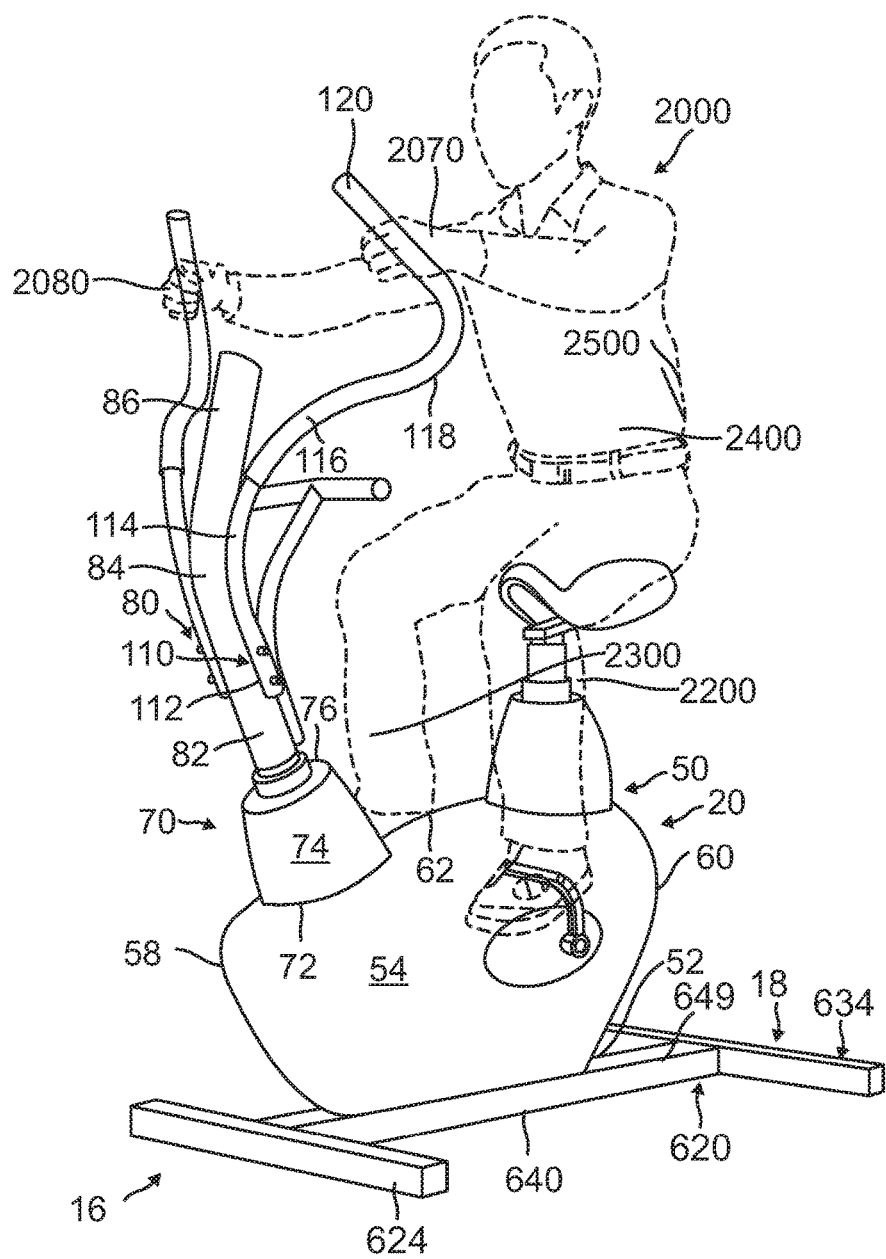
FIG. 27 is a left front perspective view of an alternative embodiment of the present invention physical fitness exercise device illustrating a rider performing both an upper body and a lower body exercise.
Figure 28:
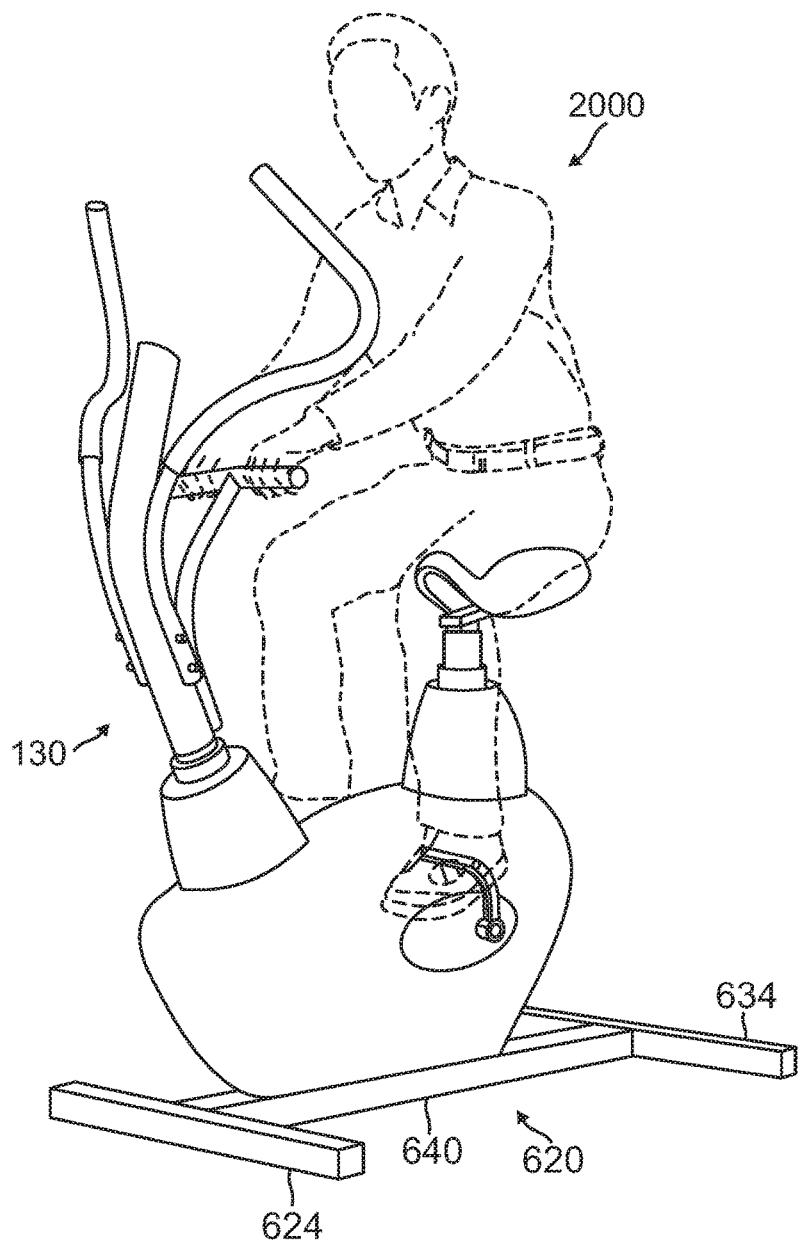
FIG. 28 is a left front perspective view of the alternative embodiment of the present invention illustrated in FIG. 27, illustrating a rider performing a horseback riding exercise.
Figure 29:
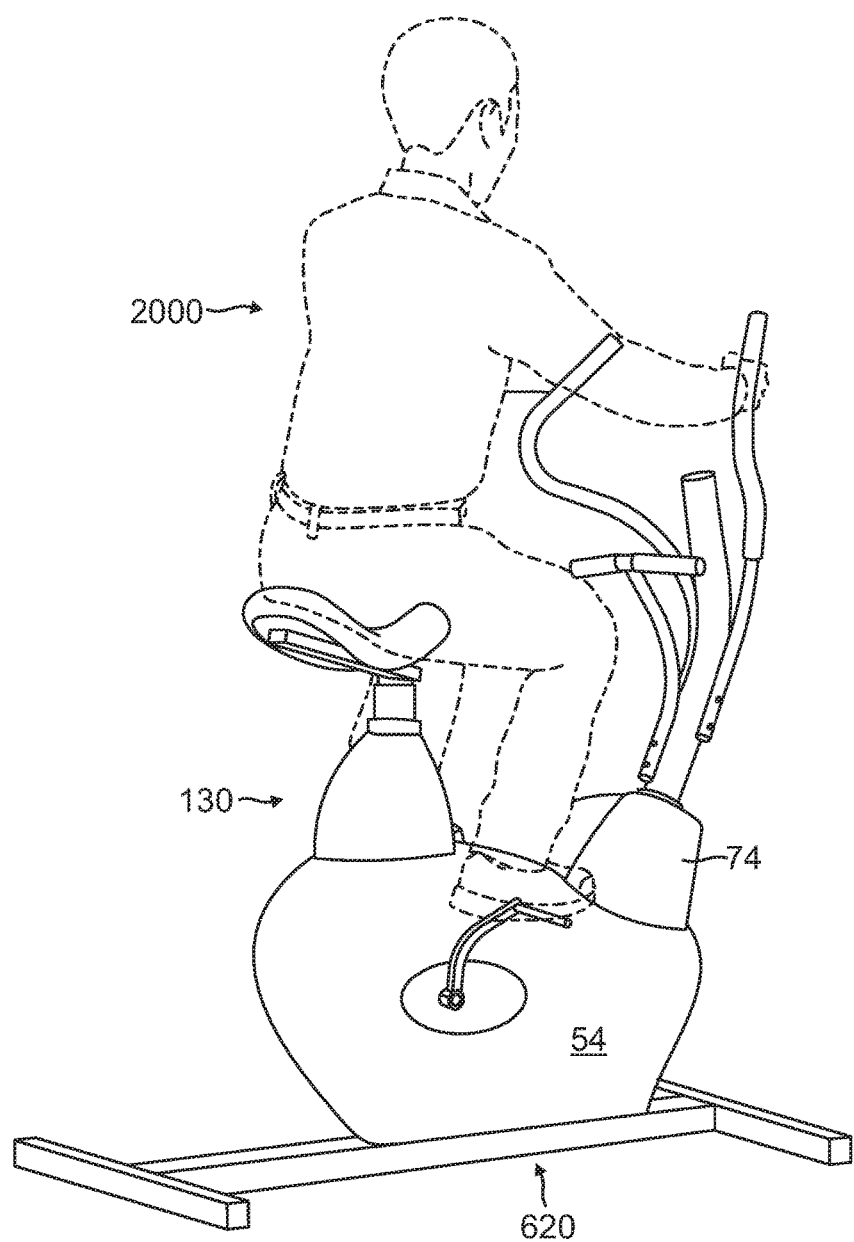
FIG. 29 is a right rear perspective view of the alternative embodiment of the present invention illustrated in FIG. 27, illustrating a rider performing both an upper body and a lower body exercise.
Figure 30:
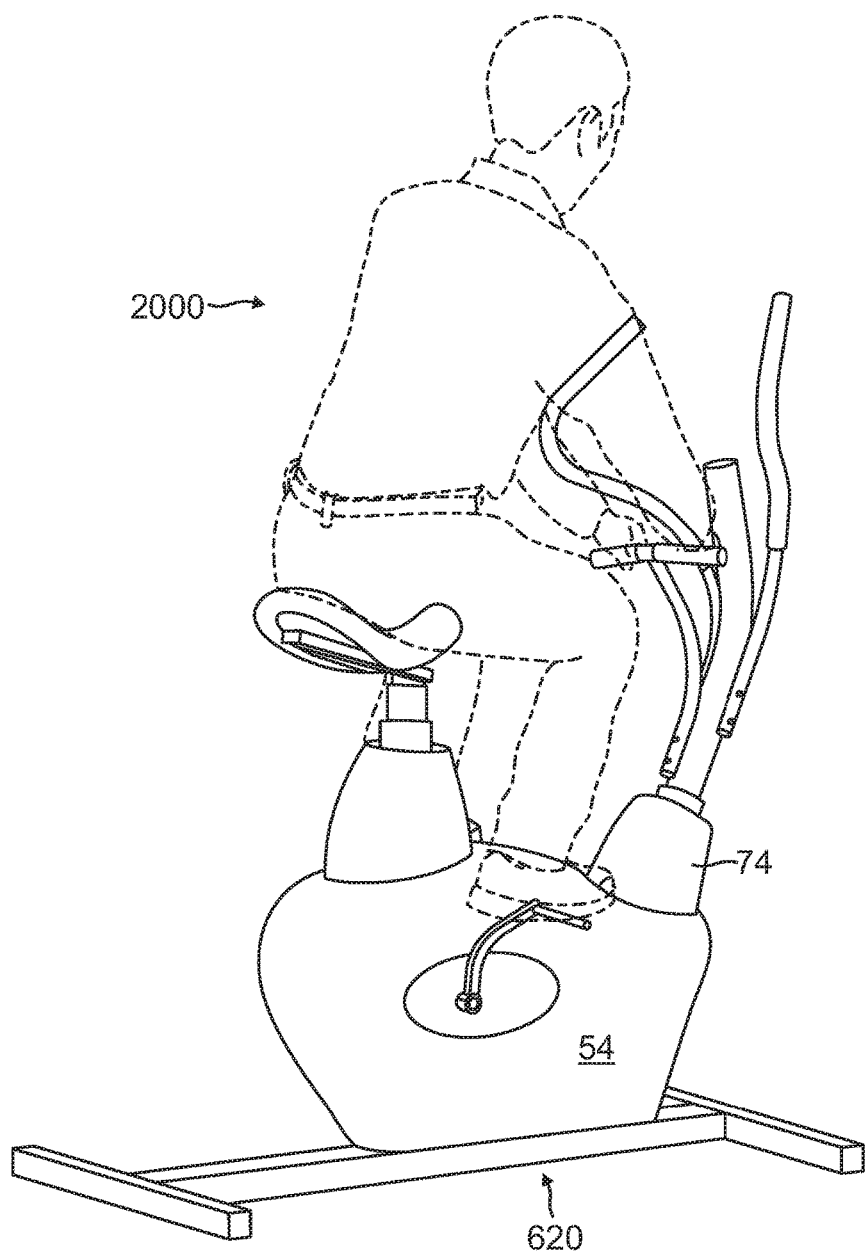
FIG. 30 is a right rear perspective view of the alternative embodiment of the present invention illustrated in FIG. 27, illustrating a rider performing a horseback riding exercise.
Figure 31:
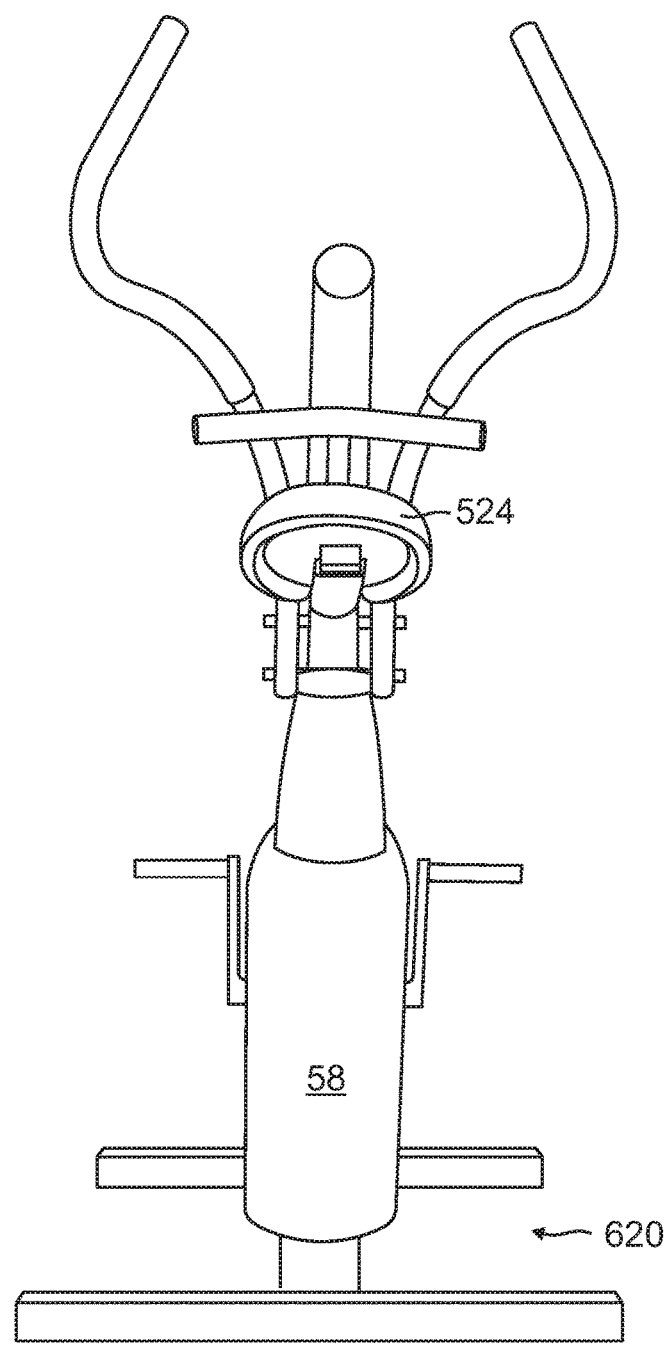
FIG. 31 is a rear elevational view of the alternative embodiment of the present invention illustrated in FIG. 27.
Figure 32:
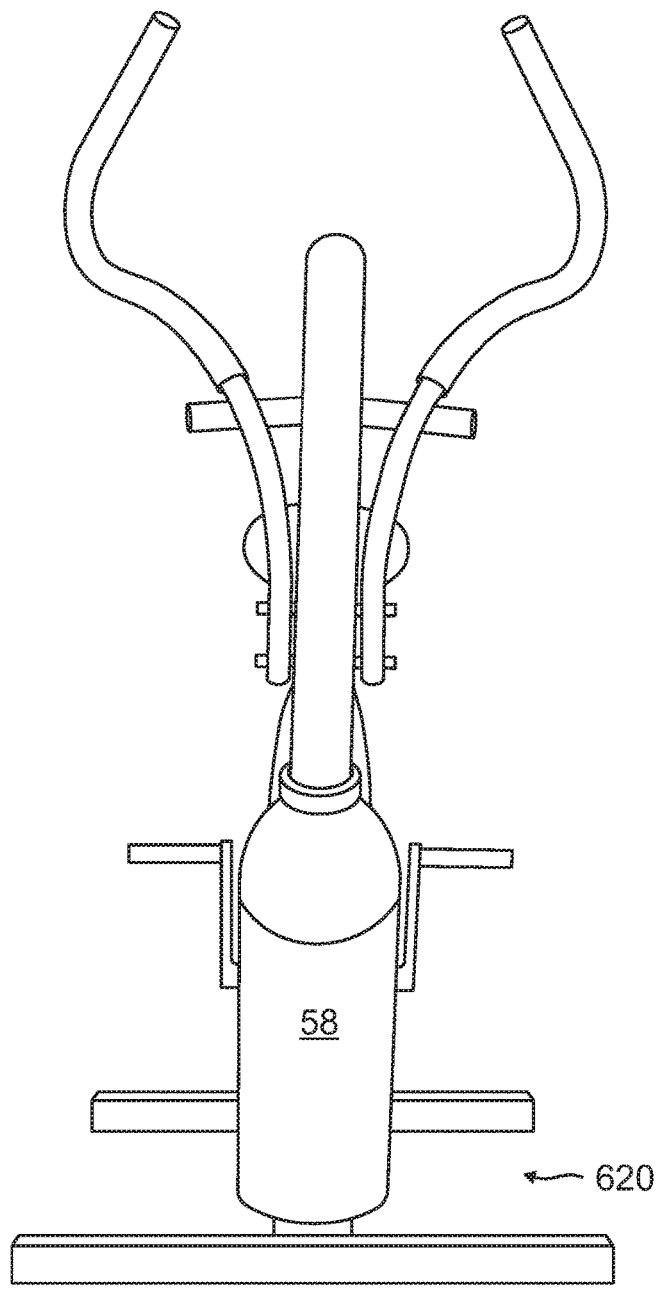
FIG. 32 is a front elevational view of the alternative embodiment of the present invention illustrated in FIG. 27.
Figure 33:
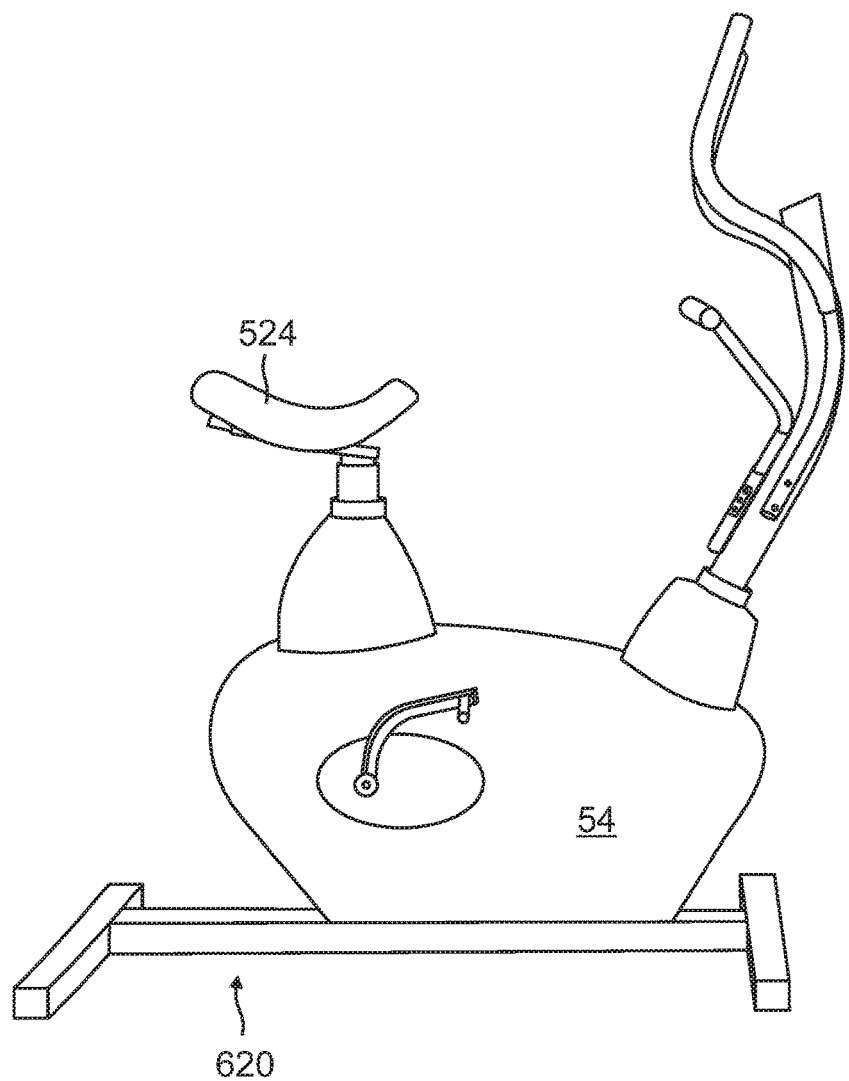
FIG. 33 is a right side-elevational view of the alternative embodiment of the present invention illustrated in FIG. 27.
Figure 34:
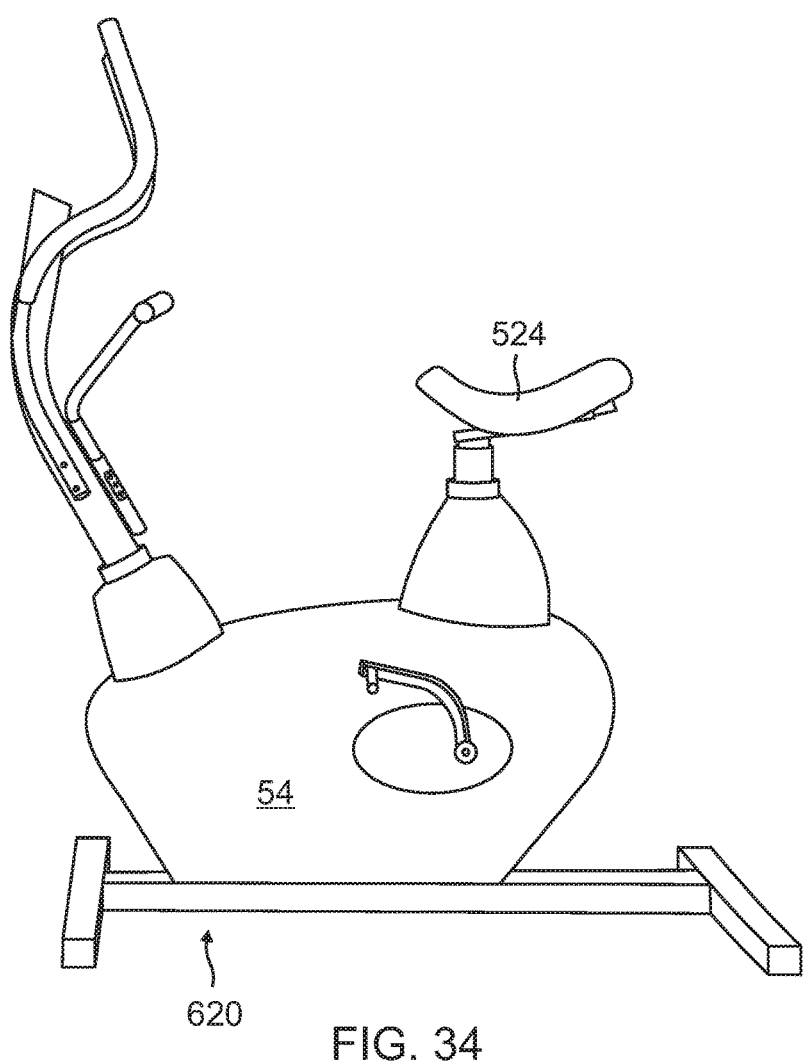
FIG. 34 is a left side-elevational view of the alternative embodiment of the invention illustrated in FIG. 27.
Figure 35:
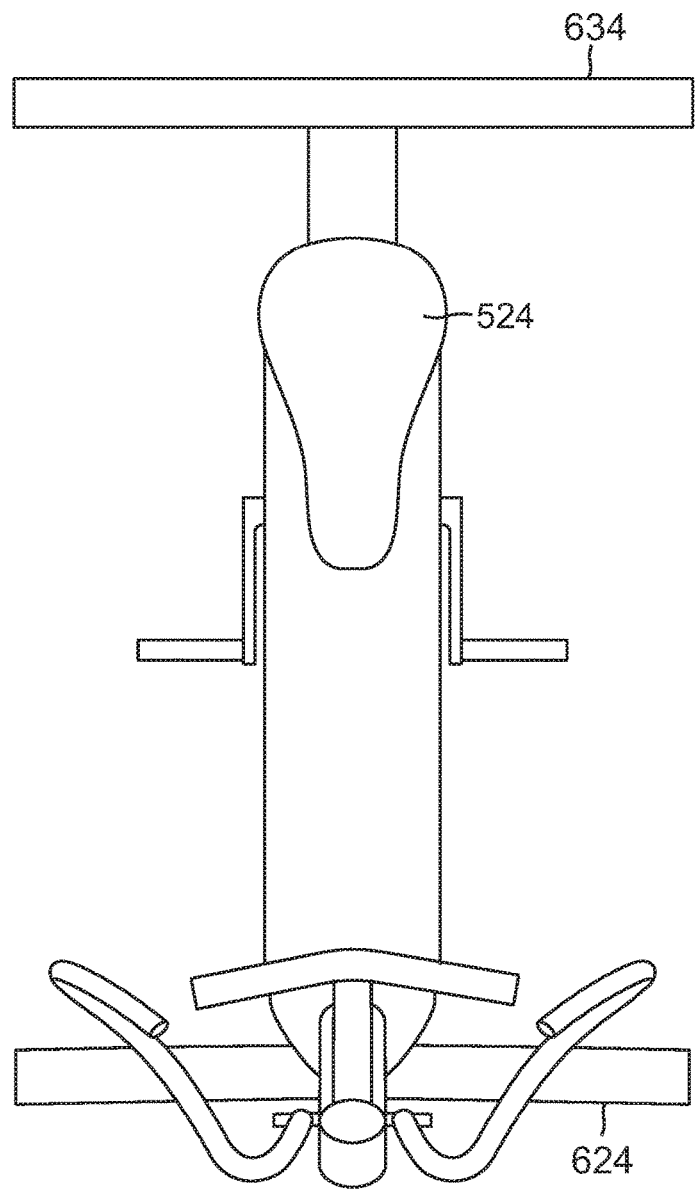
FIG. 35 is a top plan view of the embodiment of the present invention illustrated in FIG. 27.
Figure 36:
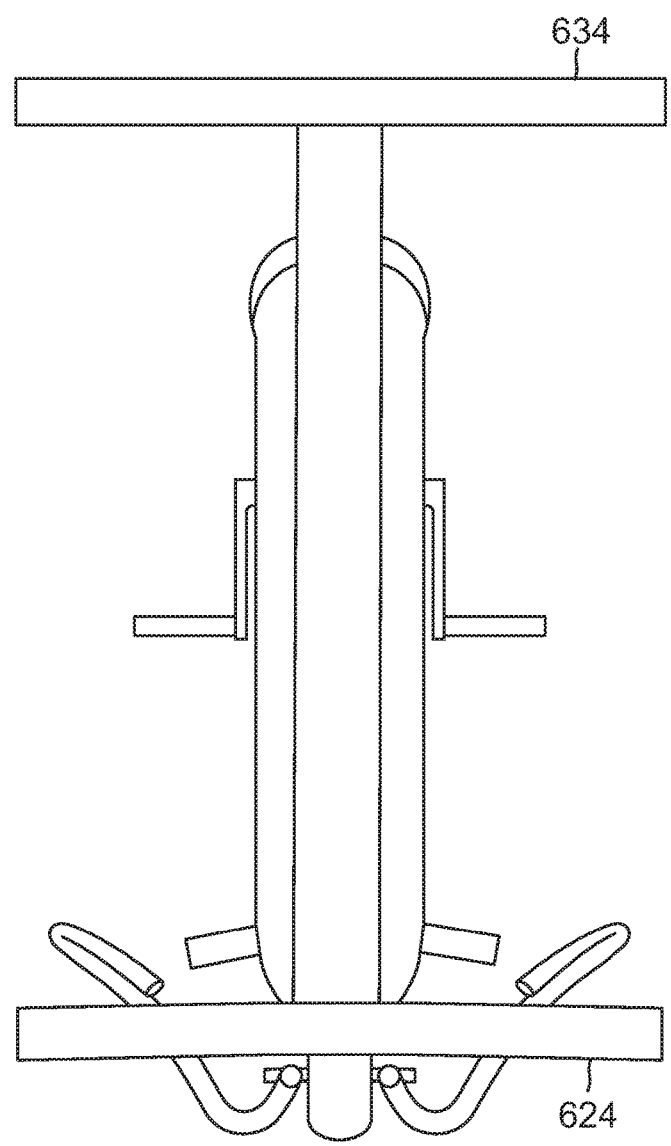
FIG. 36 is a bottom plan view of the embodiment of the present invention illustrated in FIG. 27.
Figure 37:
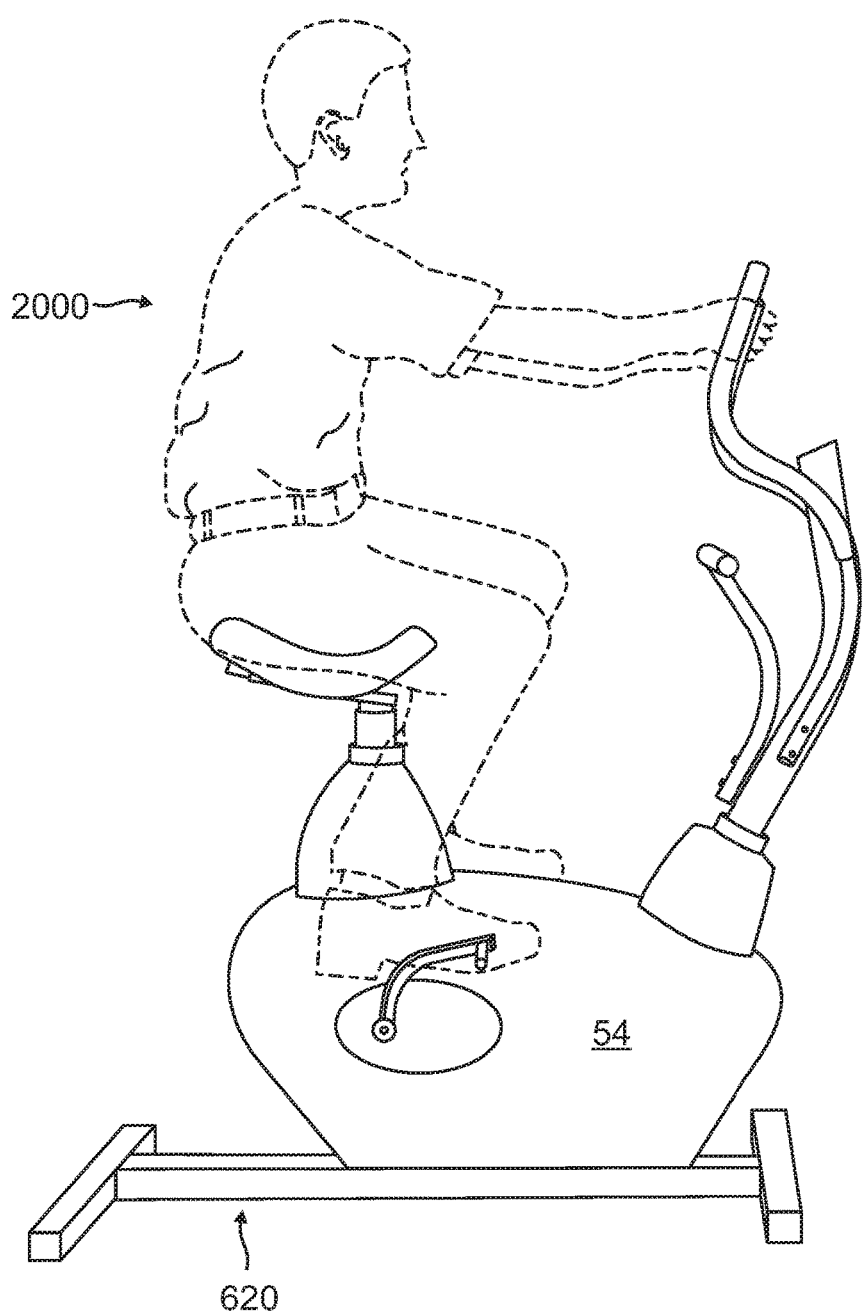
FIG. 37 is a right side-elevational view of the embodiment of the present invention illustrated in FIG. 27, illustrating a rider performing both an upper body and a lower body exercise.
Figure 38:
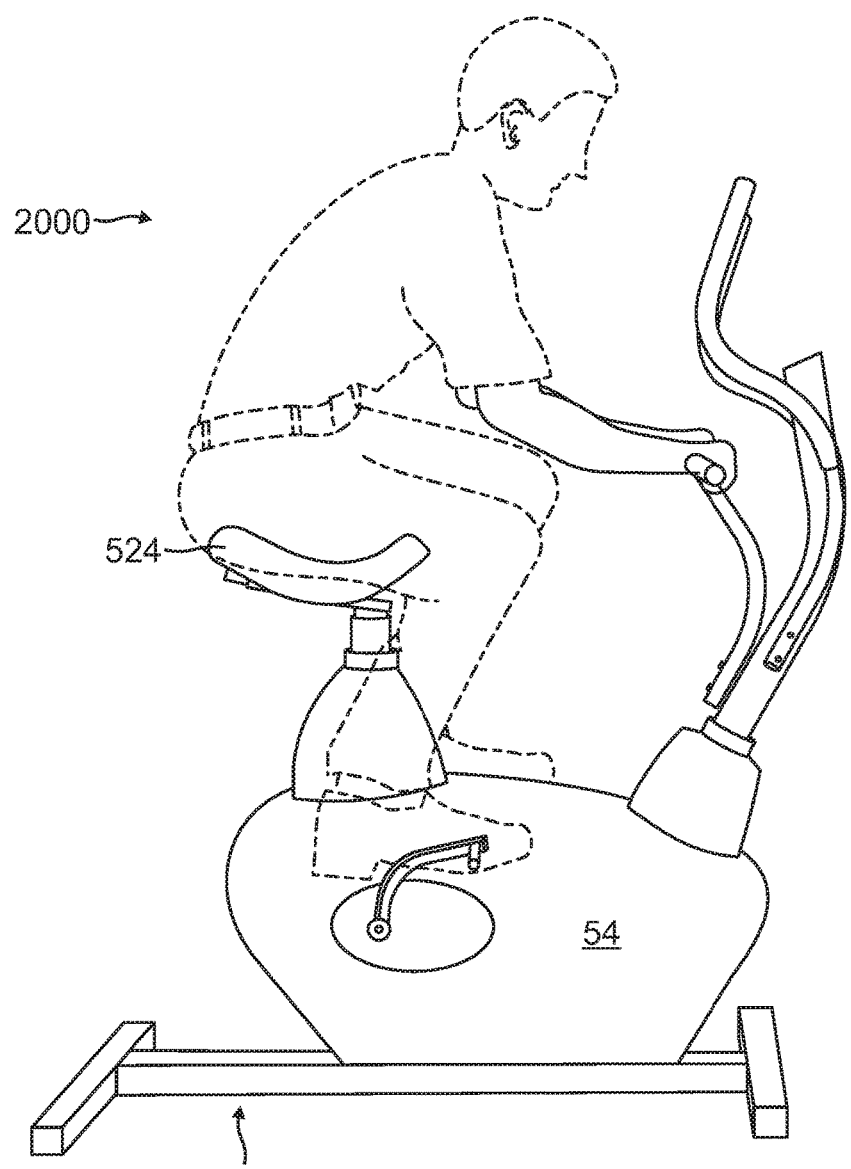
FIG. 38 is a right side-elevational view of the embodiment of the present invention illustrated in FIG. 27, illustrating a rider performing illustrating a rider performing a horseback riding.
Figure 39:
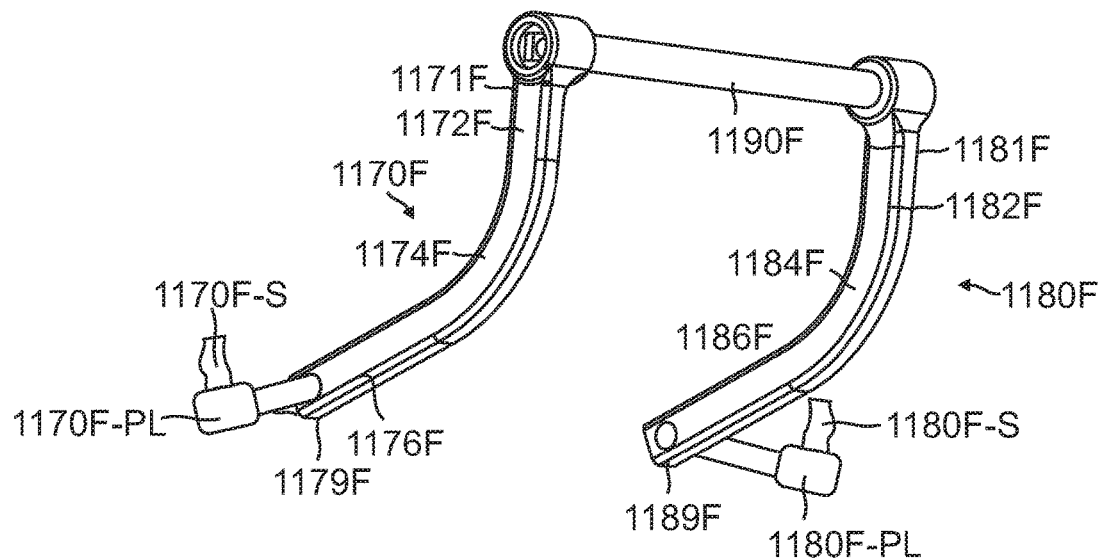
FIG. 39 is a rear perspective view of a third embodiment of a pair of parallel crank aims of the present invention with each crank arm having a downwardly extending section, an arcuate section and a downwardly and forwardly extending section, and a connecting bar connecting the pair of crank arms together, also illustrating one variation of the pedal which is a pedal plate and a strap.

A variation in the present invention is illustrated by way of example in FIG. 27 is to replace the front flexible support 24 with a fixed front transverse support 624 and the rear flexible support 34 with a fixed rear transverse support 634. Interconnecting beam 640 connects fixed transverse support 624 to rear fixed transverse support 634. The remaining components are the same and are numbered the same as the first embodiment.

The alternative variations of the remaining components will now be discussed. First, the variations on the simulation horseback riding post will be discussed. The three variations are illustrated in FIGS. 14, 15 and 16.

Referring to FIGS. 1, 7 and 14, the first variation 90T1T of the a horseback riding simulation post includes a first straight lower section 92T1T has a first lower section.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

What is claimed is:

1. An exercise apparatus comprising:
   a. a bottom section including a base with a front transverse support member at a front end interconnected to a rear transverse support member at a rear end by a longitudinal interconnecting beam;
   b. a body affixed at a bottom longitudinal wall to an upper surface of the longitudinal interconnecting beam, the body including a left sidewall and a spaced apart right sidewall interconnected by the bottom longitudinal wall, a front wall, a rear wall and top wall, surrounding an interior chamber retaining operating components of the physical fitness device;
   c. a central fixed vertically extending post including a lower straight section extending toward the front of the exercise apparatus, an arcuate section and an upper straight section extending toward the rear of the exercise apparatus;
   d. a horseback riding simulation post including a first straight lower section affixed to and aligned with the lower straight section of the central fixed vertically extending post, the first straight lower section extending to an arcuate section which extends to a second straight upper section which extends vertically and horizontally toward the rear of the exercise apparatus and towards a seat configured to support a seated rider, a distal end of the second straight upper section terminating in a handle;
   e. a left fixed grasping post including a first lower fixed section affixed to a left side of the lower straight section of the central fixed vertically extending post, the lower fixed section beginning in a first straight portion and extends to a first arcuate portion which extends in the vertical and horizontal direction toward the rear of the exercise apparatus, then extends to a second arcuate portion which extends to a third arcuate section which reverses the direction of the left fixed grasping post and extends to a grasping portion which extends in a vertical and horizontal direction toward the front of the exercise apparatus;
   f. a right fixed grasping post including a first lower fixed section affixed to a right side of the lower straight section of the central fixed vertically extending post, the lower fixed section beginning in a first straight portion and extends to a first arcuate portion which extends in the vertical and horizontal direction toward the rear of the exercise apparatus, then extends to a second arcuate portion which extends to a third arcuate section which reverses the direction of the left fixed grasping post and extends a to grasping portion which extends in a vertical and horizontal direction toward the front of the exercise apparatus;
   g, a post retaining the seat, the seat retained over the body and at a first given distance from the horseback riding simulation post and at a second given distance from the left fixed grasping post and the right fixed grasping post;
   h. a left arcuate forwardly extending crank arm including a first downwardly extending section extending to a curved intermediate section which in turn extends to a second section which is a vertically downward and forwardly extending section extending in a direction away from the seat and toward the front of the exercise device and terminating in a left pedal at a distal end of the second section and spaced away from the left sidewall of the body; and
   i. a right arcuate forwardly extending crank arm including a first downwardly extending section extending to a curved intermediate section which in turn extends to a second section which is a vertically downward and forwardly extending section extending in a direction away from the seat and toward the front of the exercise device and terminating in a right pedal at a distal end of the second section and spaced away from the right sidewall of the body.

2. The exercise apparatus in accordance with claim 1, further comprising:
   the left arcuate forwardly extending crank arm and the right arcuate forwardly extending crank arm are connected to a connecting bar, at least one of the crank arms is connected to a drive wheel which in turn is connected to a flywheel.

3. The exercise apparatus in accordance with claim 1, further comprising:
   a. the front transverse support member is a flexible oval sheet of material having a flexible upper portion separated from a parallel flexible lower portion and interconnected together by affixation members, the upper portion is separated from the lower portion by a gap; and
   b. the rear transverse support member is a flexible oval sheet of material having a flexible upper portion separated from a parallel flexible lower portion and interconnected together by affixation members, the upper portion separated from the lower portion by a gap.

4. The exercise apparatus in accordance with claim 3, further comprising:
   a. the longitudinal interconnecting beam having a front end with a front connecting plate, attaching members affixing the front connecting plate to the flexible upper portion of the front transverse support member; and
   b. the longitudinal interconnecting beam having a rear end with a rear connecting plate, attaching members affixing the rear connecting plate to the flexible upper portion of the rear transverse support member.

5. The exercise apparatus in accordance with claim 1, further comprising:
   a. the front transverse support member is a fixed beam;
   b. the rear transverse support member is a fixed beam; and
   c. the longitudinal interconnecting beam connects the front transverse support member to the rear transverse support member.

6. The exercise apparatus in accordance with claim 1, further comprising: the first straight lower section of the horseback riding simulation post having at least two portions with a lower portion telescopically receiving an upper portion.

7. The exercise apparatus in accordance with claim 1, further comprising: the second straight upper section of the horseback riding simulation post having at least two portions with a lower portion telescopically receiving an upper portion.

8. The exercise apparatus in accordance with claim 1, further comprising: both the first straight lower section of the horseback riding simulation post and the second straight upper section of the horseback riding simulation post each have at least two portions with a lower portion telescopically receiving an upper portion.

9. The exercise apparatus in accordance with claim 1, further comprising: the left fixed grasping post and the right fixed grasping post are interconnected to form integrated grasping posts.

10. The exercise apparatus in accordance with claim 1, further comprising: the front transverse support member and the rear transverse support member are each fixed beams interconnected by the longitudinal interconnecting beam which is a fixed beam.

11. The exercise apparatus in accordance with claim 1, further comprising: the front transverse support member and the rear transverse support member are each flexible oval shaped members interconnected by the longitudinal interconnecting beam which is a fixed beam.

12. The exercise apparatus in accordance with claim 1, further comprising: the handle at the distal end of the horseback riding simulation of is a saddle handle.

13. The exercise apparatus in accordance with claim 1, further comprising: the handle at the distal end of the horseback riding simulation post is a transverse handle.

14. The exercise apparatus in accordance with claim 1, further comprising:
   a. the left pedal is a plate with a strap; and
   b. the right pedal is a plate with a strap.

15. The exercise apparatus in accordance with claim 1, further comprising:
   a. the left foot pedal is a transverse beam extending away from the left sidewall; and
   b. the right foot pedal is a transverse beam extending away from the right sidewall.

16. An exercise apparatus comprising:
   a. a bottom section including a base with front transverse support member at a front end interconnected to a rear transverse support member at a rear end by a longitudinal interconnecting beam;
   b. a body affixed at a bottom longitudinal wall to the longitudinal interconnecting beam, the body including at least a left sidewall and a spaced apart right sidewall;
   c. a central fixed vertically extending post including at least a lower straight section;
   d. a horseback riding simulation post including a first straight lower section affixed to and aligned with the lower straight section of the central fixed vertically extending post, the first straight lower section extending to an arcuate section which extends to a second straight upper section which extends vertically and horizontally toward the rear of the exercise apparatus and towards a seat configured to support a seated rider, a distal end of the second straight upper section terminating in a handle;
   e. a left fixed grasping post including a first lower fixed section affixed to a left side of the lower straight section of the central fixed vertically extending post, the lower fixed section beginning in a first straight portion and extends to at least a left grasping arcuate portion which extends in the vertical and horizontal direction toward the rear of the exercise apparatus;
   f. a right fixed grasping post including a first lower fixed section affixed to a right side of the lower straight section of the central fixed vertically extending post, the lower fixed section beginning in a first straight portion and extends to at least a right grasping arcuate portion which extends in the vertical and horizontal direction toward the rear of the exercise apparatus;
   g, a post retaining the seat, the seat retained over the body and at a first given distance from the horseback riding simulation post and at a second given distance from the left fixed grasping post and the right fixed grasping post;
   h. a left arcuate forwardly extending crank arm including a first downwardly extending section extending to a curved intermediate section which in turn extends to a second section which is a vertically downward and forwardly extending section extending in a direction away from the seat and toward the front of the exercise device and terminating in a left pedal at a distal end of the second section and spaced away from the left sidewall of the body; and
   i. a right arcuate forwardly extending crank arm including a first downwardly extending section extending to a curved intermediate section which in turn extends to a second section which is a vertically downward and forwardly extending section extending in a direction away from the seat and toward the front of the exercise device and terminating in a right pedal at a distal end of the second section and spaced away from the right sidewall of the body.

17. The exercise apparatus in accordance with claim 16, further comprising:
   a. the front transverse support member is a flexible oval sheet of material having a flexible upper portion separated from a parallel flexible lower portion and interconnected together by affixation members, the upper portion is separated from the lower portion by a gap; and
   b. the rear transverse support member is a flexible oval sheet of material having a flexible upper portion separated from a parallel flexible lower portion and interconnected together by affixation members, the upper portion separated from the lower portion by a gap.

18. An exercise apparatus comprising:
   a. a bottom section including a base with front transverse support member at a front end interconnected to a rear transverse support member at a rear end by a longitudinal interconnecting beam;
   b. a body affixed at a bottom longitudinal wall to the longitudinal interconnecting beam, the body including at least a left sidewall and a spaced apart right sidewall;
   c. a central fixed vertically extending post including at least a lower straight section;
   d. a horseback riding simulation post including a first straight lower section affixed to and aligned with the lower straight section of the central fixed vertically extending post, the first straight lower section extending to an arcuate section which extends to a second straight upper section which extends vertically and horizontally toward the rear of the exercise apparatus and towards a seat configured to support a seated rider, a distal end of the second straight upper section terminating in a handle;

e. a left fixed grasping post including a first lower fixed section affixed to a left side of the lower straight section of the central fixed vertically extending post, the lower fixed section beginning in a first straight portion and extends to at least a left grasping arcuate portion which extends in the vertical and horizontal direction toward the rear of the exercise apparatus;

f. a right fixed grasping post including a first lower fixed section affixed to a right side of the lower straight section of the central fixed vertically extending post, the lower fixed section beginning in a first straight portion and extends to at least a right grasping arcuate portion which extends in the vertical and horizontal direction toward the rear of the exercise apparatus;

g, a post retaining the seat, the seat retained over the body and at a first given distance from the horseback riding simulation post and at a second given distance from the left fixed grasping post and right second fixed grasping post;

h. a left straight crank arm terminating in a left pedal at a distal end; and i. a right straight crank arm terminating in a right pedal at a distal end.

19. The exercise apparatus in accordance with claim 18, further comprising:

a. the front transverse support member is a flexible oval sheet of material having a flexible upper portion separated from a parallel flexible lower portion and interconnected together by affixation members, the upper portion is separated from the lower portion by a gap; and b. the rear transverse support member is a flexible oval sheet of material having a flexible upper portion separated from a parallel flexible lower portion and interconnected together by affixation members, the upper portion separated from the lower portion by a gap.

* * * * *